(12) United States Patent
Chitrapu et al.

(10) Patent No.: US 7,929,409 B2
(45) Date of Patent: Apr. 19, 2011

(54) ORTHOGONAL FREQUENCY DIVISION MULTIPLEXING (OFDM) METHOD AND APPARATUS FOR PROTECTING AND AUTHENTICATING WIRELESSLY TRANSMITTED DIGITAL INFORMATION

(75) Inventors: Prabhakar R. Chitrapu, Blue Bell, PA (US); John David Kaewell, Jr., Jamison, PA (US); Robert Lind Olesen, Huntington, NY (US); Sung-Hyuk Shin, Northvale, NJ (US); John Erich Hoffmann, Indialantic, FL (US); Richard Dan Herschaft, Whitestone, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 650 days.

(21) Appl. No.: 11/035,174

(22) Filed: Jan. 13, 2005

(65) Prior Publication Data

US 2005/0180315 A1 Aug. 18, 2005

Related U.S. Application Data

(60) Provisional application No. 60/536,133, filed on Jan. 13, 2004, provisional application No. 60/536,144, filed on Jan. 13, 2004.

(51) Int. Cl.
*H04J 11/00* (2006.01)
(52) U.S. Cl. .......................................... 370/208; 370/210
(58) Field of Classification Search .................. 370/204, 370/321, 208, 247, 250, 205–206; 382/100; 455/466, 456, 247, 522, 574; 713/171, 172, 713/173, 174, 193; 375/260, 140, 147
See application file for complete search history.

(56) References Cited

U.S. PATENT DOCUMENTS

| | | |
|---|---|---|
| 5,201,000 A | 4/1993 | Matyas et al. |
| 5,274,666 A | 12/1993 | Dowdell et al. |
| 5,568,483 A | 10/1996 | Padovani et al. |
| 5,602,916 A | 2/1997 | Grube et al. |
| 5,778,304 A | 7/1998 | Grube et al. |
| 5,808,296 A | 9/1998 | McMonagle et al. |
| 5,872,519 A | 2/1999 | Issa et al. |

(Continued)

FOREIGN PATENT DOCUMENTS

CA 2454761 2/2003

(Continued)

OTHER PUBLICATIONS

Alattar, "Smart Images' Using *Digimarc's* Watermarking Technology," IS&T/SPIE's 12th International Symposium on Electronic Imaging, San Jose, CA, vol. 3971, No. 25, (Jan. 25, 2000).

(Continued)

*Primary Examiner* — Ricky Ngo
*Assistant Examiner* — David Oveissi
(74) *Attorney, Agent, or Firm* — Woodcock Washburn LLP

(57) ABSTRACT

A method and apparatus for protecting and authenticating wirelessly transmitted digital information using numerous techniques. The apparatus may be a wireless orthogonal frequency division multiplexing (OFDM) communication system, a base station, a wireless transmit/receive unit (WTRU), a transmitter, a receiver and/or an integrated circuit (IC). The wireless OFDM communication system includes a transmitter which steganographically embeds digital information in an OFDM communication signal and wirelessly transmits the OFDM communication signal. The system further includes a receiver which receives the OFDM communication signal and extracts the steganographically embedded digital information from the received OFDM communication signal.

59 Claims, 19 Drawing Sheets

U.S. PATENT DOCUMENTS

| | | | |
|---|---|---|---|
| 5,953,424 A | 9/1999 | Vogelesang et al. | |
| 5,960,081 A | 9/1999 | Vynne et al. | |
| 5,966,441 A | 10/1999 | Calamera | |
| 6,018,374 A | 1/2000 | Wrobleski | |
| 6,035,398 A | 3/2000 | Bjorn | |
| 6,115,580 A | 9/2000 | Chuprun et al. | |
| 6,185,682 B1* | 2/2001 | Tang | 713/168 |
| 6,266,541 B1 | 7/2001 | Noda | |
| 6,307,936 B1 | 10/2001 | Ober et al. | |
| 6,343,213 B1 | 1/2002 | Steer et al. | |
| 6,353,778 B1 | 3/2002 | Brown | |
| 6,359,998 B1 | 3/2002 | Cooklev | |
| 6,393,254 B1 | 5/2002 | Pousada | |
| 6,473,560 B1 | 10/2002 | Linnartz et al. | |
| 6,492,897 B1 | 12/2002 | Mowery, Jr. | |
| 6,496,928 B1 | 12/2002 | Deo et al. | |
| 6,529,600 B1 | 3/2003 | Epstein et al. | |
| 6,559,883 B1 | 5/2003 | Fancher et al. | |
| 6,591,096 B2 | 7/2003 | Ezuriko | |
| 6,625,455 B1 | 9/2003 | Ariga | |
| 6,661,373 B1 | 12/2003 | Holliday | |
| 6,662,023 B1 | 12/2003 | Helle | |
| 6,664,976 B2 | 12/2003 | Lofgren et al. | |
| 6,687,375 B1 | 2/2004 | Matyas et al. | |
| 6,687,497 B1 | 2/2004 | Parvulescu et al. | |
| 6,728,323 B1 | 4/2004 | Chen et al. | |
| 6,738,572 B2 | 5/2004 | Hunter | |
| 6,771,946 B1 | 8/2004 | Oyaski | |
| 6,792,130 B1 | 9/2004 | Jones et al. | |
| 6,868,229 B2 | 3/2005 | Balogh | |
| 6,880,009 B2 | 4/2005 | Charas | |
| 6,915,002 B2 | 7/2005 | Gustafson | |
| 6,928,287 B2 | 8/2005 | Trott et al. | |
| 6,937,843 B2 | 8/2005 | Foschini et al. | |
| 6,983,376 B2 | 1/2006 | Maggenti | |
| 7,055,033 B2* | 5/2006 | Guthery | 713/172 |
| 7,079,480 B2* | 7/2006 | Agee | 370/204 |
| 7,171,020 B2 | 1/2007 | Rhoads et al. | |
| 7,173,972 B2* | 2/2007 | Thomson et al. | 375/260 |
| 7,203,527 B2* | 4/2007 | Czaja et al. | 455/574 |
| 7,266,217 B2 | 9/2007 | Rhoads et al. | |
| 2001/0031631 A1 | 10/2001 | Pitts | |
| 2001/0037465 A1 | 11/2001 | Hart, III et al. | |
| 2002/0021721 A1* | 2/2002 | Jiang et al. | 370/910 |
| 2002/0039896 A1 | 4/2002 | Brown | |
| 2002/0055361 A1 | 5/2002 | McDonnell et al. | |
| 2002/0058497 A1 | 5/2002 | Jeong | |
| 2002/0066111 A1 | 5/2002 | Rodriguez | |
| 2002/0076084 A1 | 6/2002 | Tian et al. | |
| 2002/0107032 A1 | 8/2002 | Agness et al. | |
| 2002/0186845 A1 | 12/2002 | Dutta et al. | |
| 2003/0009683 A1 | 1/2003 | Schwenck et al. | |
| 2003/0030680 A1 | 2/2003 | Cofta et al. | |
| 2003/0040326 A1* | 2/2003 | Levy et al. | 455/466 |
| 2003/0072450 A1 | 4/2003 | Maggenti | |
| 2003/0078076 A1 | 4/2003 | Kuwajima et al. | |
| 2003/0086371 A1 | 5/2003 | Walton et al. | |
| 2003/0122671 A1 | 7/2003 | Jespersen | |
| 2003/0123659 A1 | 7/2003 | Forstrom et al. | |
| 2003/0133573 A1 | 7/2003 | Himmel et al. | |
| 2003/0169342 A1 | 9/2003 | Steinberg et al. | |
| 2003/0174858 A1 | 9/2003 | Kim et al. | |
| 2003/0219231 A1 | 11/2003 | Vernon | |
| 2004/0001553 A1* | 1/2004 | Steentra et al. | 375/260 |
| 2004/0029560 A1 | 2/2004 | Ariga | |
| 2004/0057456 A1 | 3/2004 | He et al. | |
| 2004/0081131 A1 | 4/2004 | Walton et al. | |
| 2004/0100897 A1* | 5/2004 | Shattil | 370/206 |
| 2004/0109566 A1 | 6/2004 | Yamamoto | |
| 2004/0110515 A1 | 6/2004 | Blumberg et al. | |
| 2004/0143750 A1 | 7/2004 | Kulack et al. | |
| 2004/0155969 A1 | 8/2004 | Hayashi | |
| 2004/0157620 A1 | 8/2004 | Nyu | |
| 2004/0198306 A1 | 10/2004 | Singh et al. | |
| 2004/0204021 A1 | 10/2004 | Cocita | |
| 2004/0252837 A1 | 12/2004 | Harvey et al. | |
| 2004/0264699 A1 | 12/2004 | Meandzija et al. | |
| 2004/0264701 A1 | 12/2004 | Lee et al. | |
| 2005/0007456 A1 | 1/2005 | Lee et al. | |
| 2005/0008324 A1 | 1/2005 | Balogh | |
| 2005/0039020 A1 | 2/2005 | Levy | |
| 2005/0043548 A1 | 2/2005 | Cates | |
| 2005/0064865 A1 | 3/2005 | Goldberg | |
| 2005/0094719 A1* | 5/2005 | Young | 375/222 |
| 2005/0180315 A1 | 8/2005 | Chitrapu et al. | |
| 2005/0220322 A1 | 10/2005 | Olesen et al. | |
| 2006/0156009 A1 | 7/2006 | Shin et al. | |
| 2006/0200673 A1 | 9/2006 | Zhang et al. | |
| 2007/0071241 A1 | 3/2007 | Caprella et al. | |
| 2007/0121939 A1 | 5/2007 | Olesen et al. | |

FOREIGN PATENT DOCUMENTS

| | | |
|---|---|---|
| CN | 1377180 | 4/2002 |
| EP | 0 505 266 | 3/1992 |
| EP | 0 830 046 | 3/1998 |
| EP | 1 130 500 | 9/2001 |
| EP | 1 139 684 | 10/2001 |
| EP | 1 172 270 | 1/2002 |
| EP | 1 182 901 | 2/2002 |
| EP | 1 379 098 | 1/2004 |
| EP | 1 381 234 | 1/2004 |
| EP | 1 185 923 | 3/2004 |
| EP | 1 445 923 | 8/2004 |
| EP | 1 499 148 | 1/2005 |
| GB | 211612 | 2/1927 |
| GB | 2 329 794 | 3/1999 |
| GB | 2 343 339 | 5/2000 |
| GB | 2 348 573 | 10/2000 |
| GB | 2 367 720 | 4/2002 |
| GB | 2 374 986 | 10/2002 |
| GB | 2 393 075 | 3/2004 |
| JP | 2000013497 | 1/2000 |
| JP | 2000032557 | 1/2000 |
| JP | 2000152217 | 5/2000 |
| JP | 2000165952 | 6/2000 |
| JP | 2000332890 | 11/2000 |
| JP | 2001313006 | 11/2001 |
| JP | 2002044736 | 2/2002 |
| JP | 2002125267 | 4/2002 |
| JP | 2002159059 | 5/2002 |
| JP | 2003058173 | 2/2003 |
| JP | 2003070058 | 3/2003 |
| JP | 2003143649 | 5/2003 |
| JP | 2003219466 | 7/2003 |
| JP | 2004056769 | 2/2004 |
| JP | 2004088273 | 3/2004 |
| JP | 2004153324 | 5/2004 |
| JP | 2004242096 | 8/2004 |
| JP | 2004260631 | 9/2004 |
| JP | 2004260796 | 9/2004 |
| JP | 2005033799 | 2/2005 |
| TW | 529281 | 4/2003 |
| TW | 563305 | 11/2003 |
| WO | 98/34412 | 8/1998 |
| WO | 99/59335 | 11/1999 |
| WO | 00/60556 | 10/2000 |
| WO | 02/103968 | 12/2002 |
| WO | 03/028342 | 4/2003 |
| WO | 03/040898 | 5/2003 |
| WO | 03/047207 | 6/2003 |
| WO | 2004/089021 | 10/2004 |
| WO | 2004/102313 | 11/2004 |

OTHER PUBLICATIONS

Arslanagic, "Personal Firewall in Mobile Phone", Masters Thesis in Information and Communication Technology, Agder University College Faculty of Engineering and Science, Grimstad, Norway (May 2004).

Costa, M.H., "Writing on Dirty Paper," IEEE Transactions on Information Theory, vol. IT-29 No. 3, pp. 439-441, (1983).

Cox et al., "Watermarking as Communications with Side Information," Proceedings of the IEEE, pp. 1127-1141, (1999).

Menezes, Alfred J. et al. "Handbook of Applied Cryptography", p. 172, (1997).

Mobasseri, "Exploring CDMA for Watermarking of Digital Video", Security and Watermarking of Multimedia Contents, Electronic Imaging'99, San Jose, (Jan. 23-29, 1999).

Podilchuk et al., "Digital Watermarking: Algorithms and Applications," IEEE Signal Processing Magazine, (Jul. 2001).

Sanzgiri et al., "A Secure Routing Protocol for Ad Hoc Networks," Proceedings of the 10$^{th}$ IEEE International Conference on Network Protocols (ICNP '02), IEEE, pp. 1-10, (2002).

Schneier, Bruce "Applied Cryptography" Second Edition, pp. 180 and 426-480, (1996).

Song et al., "Meta-fragile Watermarking for Wireless Networks," International Conference on Communications, Circuits and Systems and West Sino Expositions, IEEE 2002, vol. 1, pp. 490-491, (Jun. 29, 2002).

Third Generation Partnership Project, "Technical Specification Group Radio Access Network; Multiplexing and channel coding (FDD) (Release 5)," 3GPP TS 25.212 V5.6.0 (Sep. 2003).

Third Generation Partnership Project 2, "Physical Layer Standard for cdma2000 Spread Spectrum Systems (Release C)," 3GPP2 C.S0002-C Version 1.0 (May 2002).

Menezes et al., *Handbook of Applied Cryptography*, 1997, p. 172.

Schneier, *Applied Cryptography Second Edition*, 1996, pp. 180 and 426-428.

Alattar, "*Smart Images*' Using *Digimarc's* Watermarking Technology," Is&T/SPIE's 12$^{th}$ International Symposium on Electronic Imaging, San Jose, CA vol. 3971, No. 25, (Jan. 25, 2000).

Chen et al., "The Research Developments and Applications of Digital Watermarking," China Academic Journal Electronic Publishing House, vol. 22, No. 5 (May 2001).

\* cited by examiner

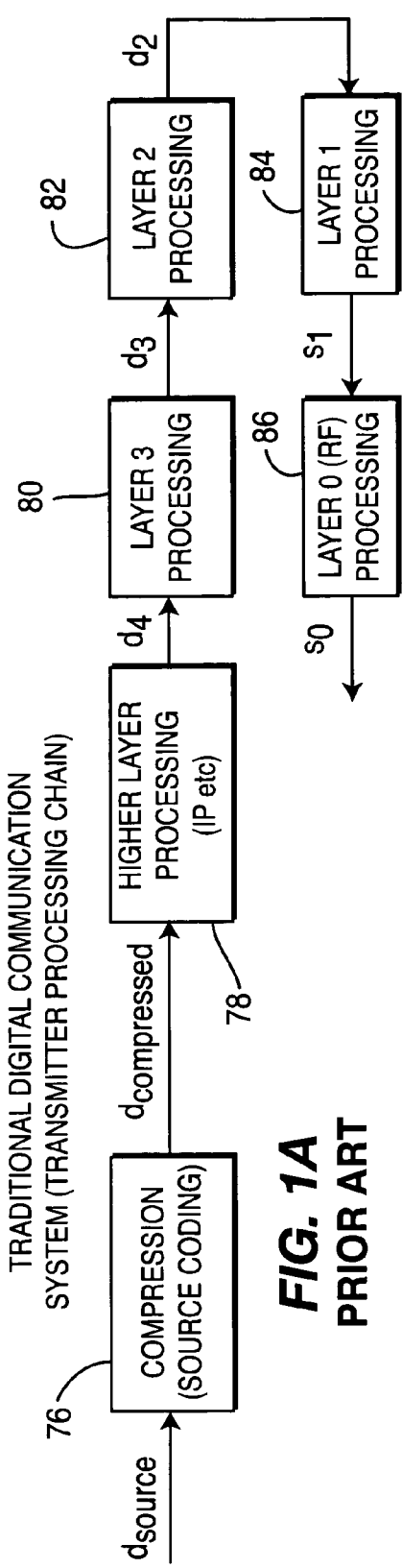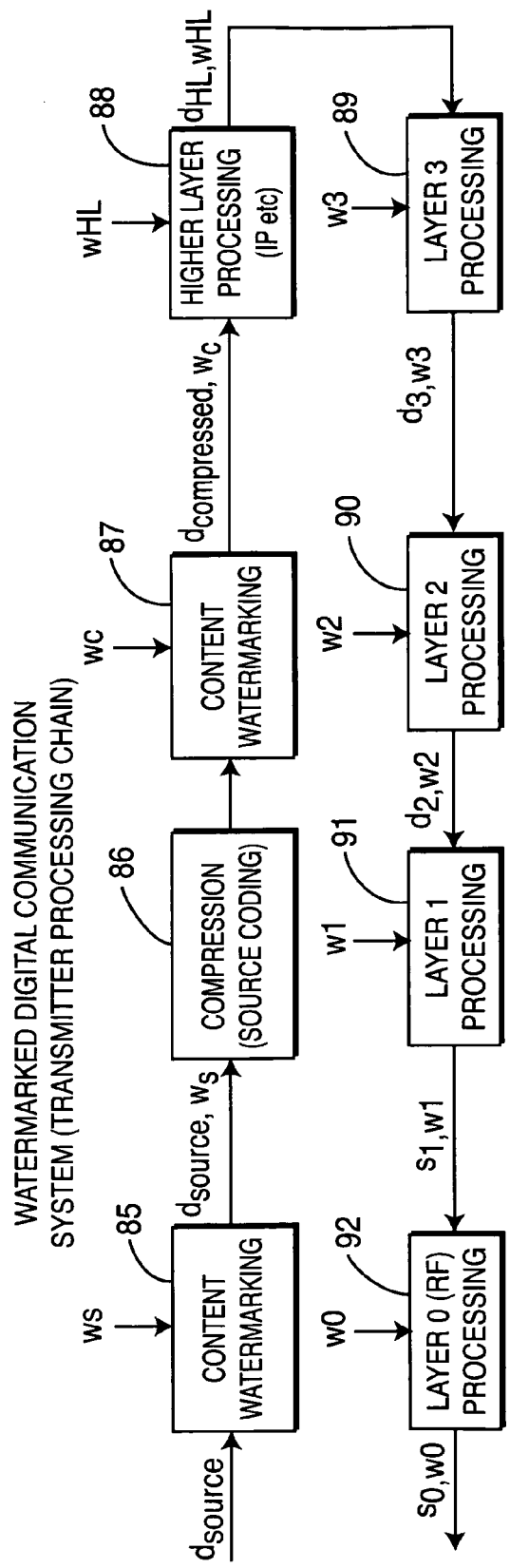

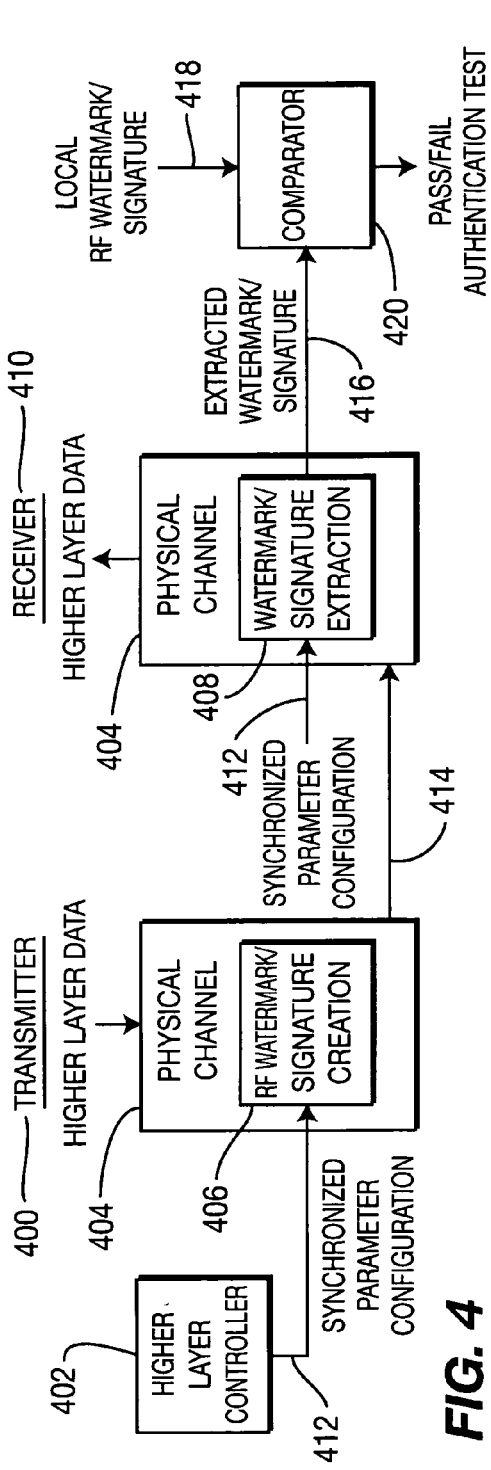
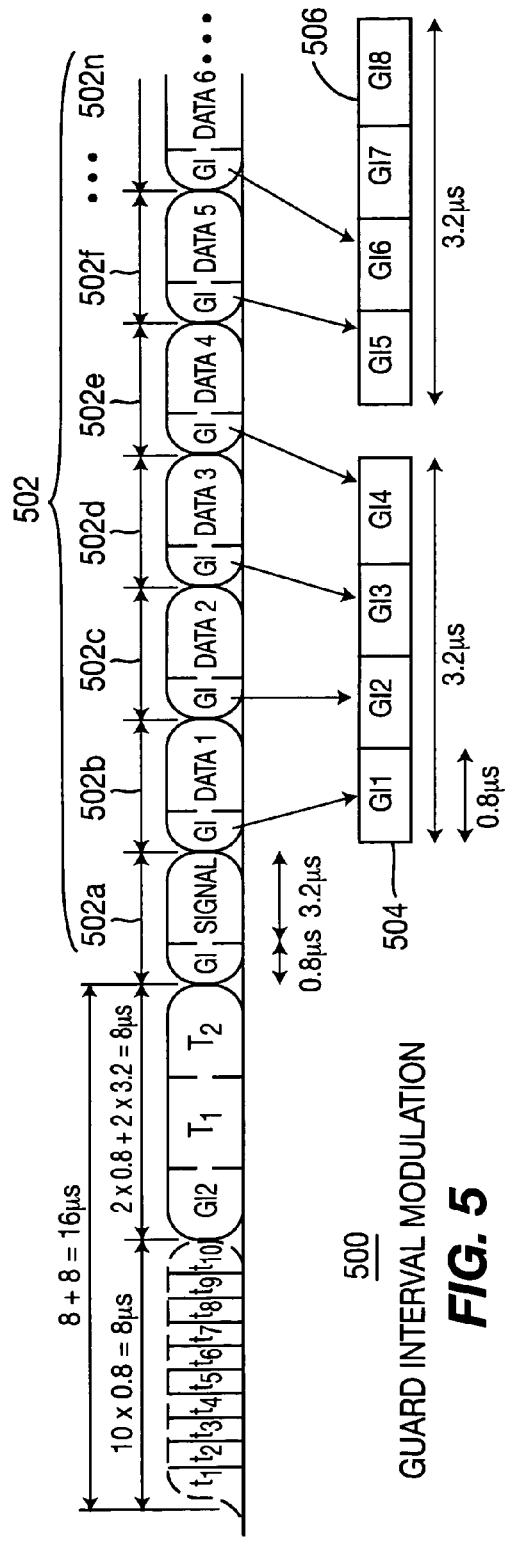

AMPLITUDE PROFILES

AMPLITUDE MODULATION OF SUB-CARRIERS

HIDE LOWER POWER SUB-CARRIERS IN BANDS 806 & 808

SCRAMBLING CODE MODIFICATIONS

LONG PREAMBLE PPDU FORMAT FOR CCK-OFDM
VARY SYNCHRONIZATION BITS

PPDU FRAME FORMAT (RESERVED BITS)

SERVICE FIELD BIT ASSIGNMENT

SIGNAL FIELD BIT ASSIGNMENT

SIGNAL FIELD BIT ASSIGNMENT

| RATE (MBITS/S) | R1-R4 | UNUSED BIT PATTERNS |
|---|---|---|
| 6 | 1101 | 1100 |
| 9 | 1111 | 1110 |
| 12 | 0101 | 0100 |
| 18 | 0111 | 0110 |
| 24 | 1001 | 1000 |
| 36 | 1011 | 1010 |
| 48 | 0001 | 0000 |
| 54 | 0011 | 0010 |

RATE BIT MAPS

**PPDU FRAME FORMAT
(MANIPULATION IN TAIL BITS)**

SIGNAL FIELD BIT ASSIGNMENT

PPDU FRAME FORMAT
(PAD BIT OCCUPATION)

EXAMPLES:

- PPDUs WITHOUT THE RESERVED BIT SET IN THE PLCP HEADER ARE NOT GENUINE.
- ANY WAVEFORM SIGNATURE CAN BE USED TO AUTHENTICATE DATA PACKETS.

PPDU FRAME FORMAT
(NETWORK AVAILABILITY)

CARRIER FREQUENCY MODULATION

PULSE SHAPE MODIFICATION OR INTENTIONAL GAIN SLOPE THAT
CONTINUES TO MEET THE TRANSMIT SPECTRUM MASK.

PULSE SPECTRUM SHAPING

DC TERM SUB-CARRIER

CONSTELLATION ROTATION

ANTENNA POLARIZATION

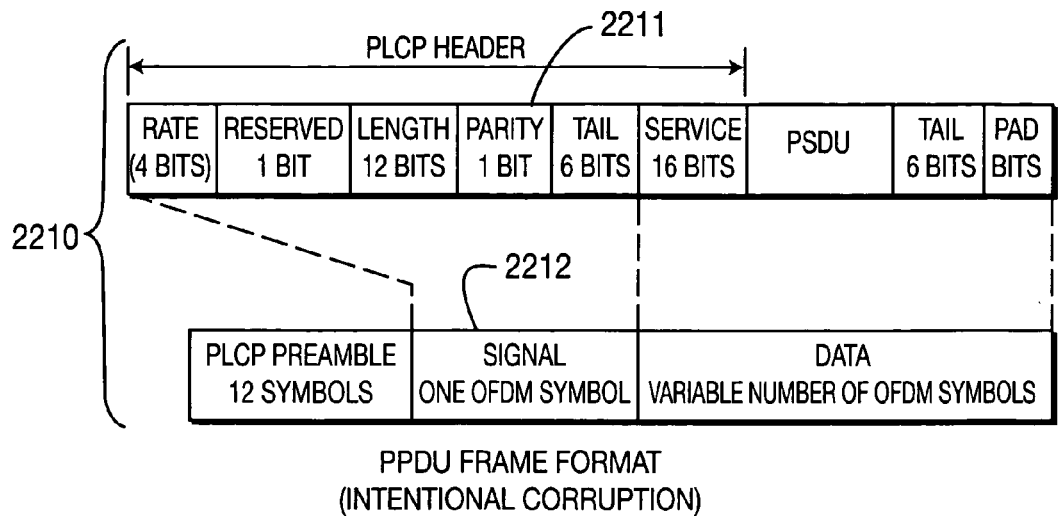
PPDU FRAME FORMAT
(INTENTIONAL CORRUPTION)
FIG. 22A
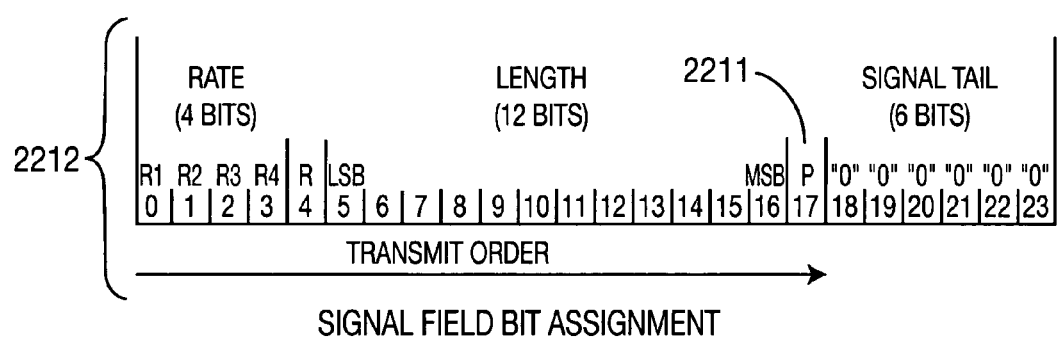
SIGNAL FIELD BIT ASSIGNMENT
FIG. 22B
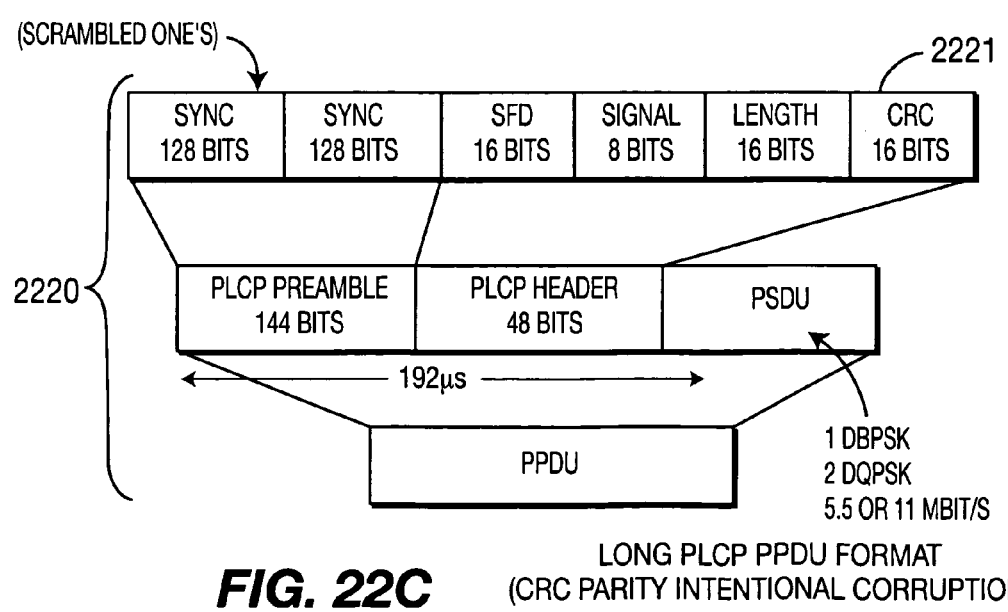
FIG. 22C  LONG PLCP PPDU FORMAT
(CRC PARITY INTENTIONAL CORRUPTION)

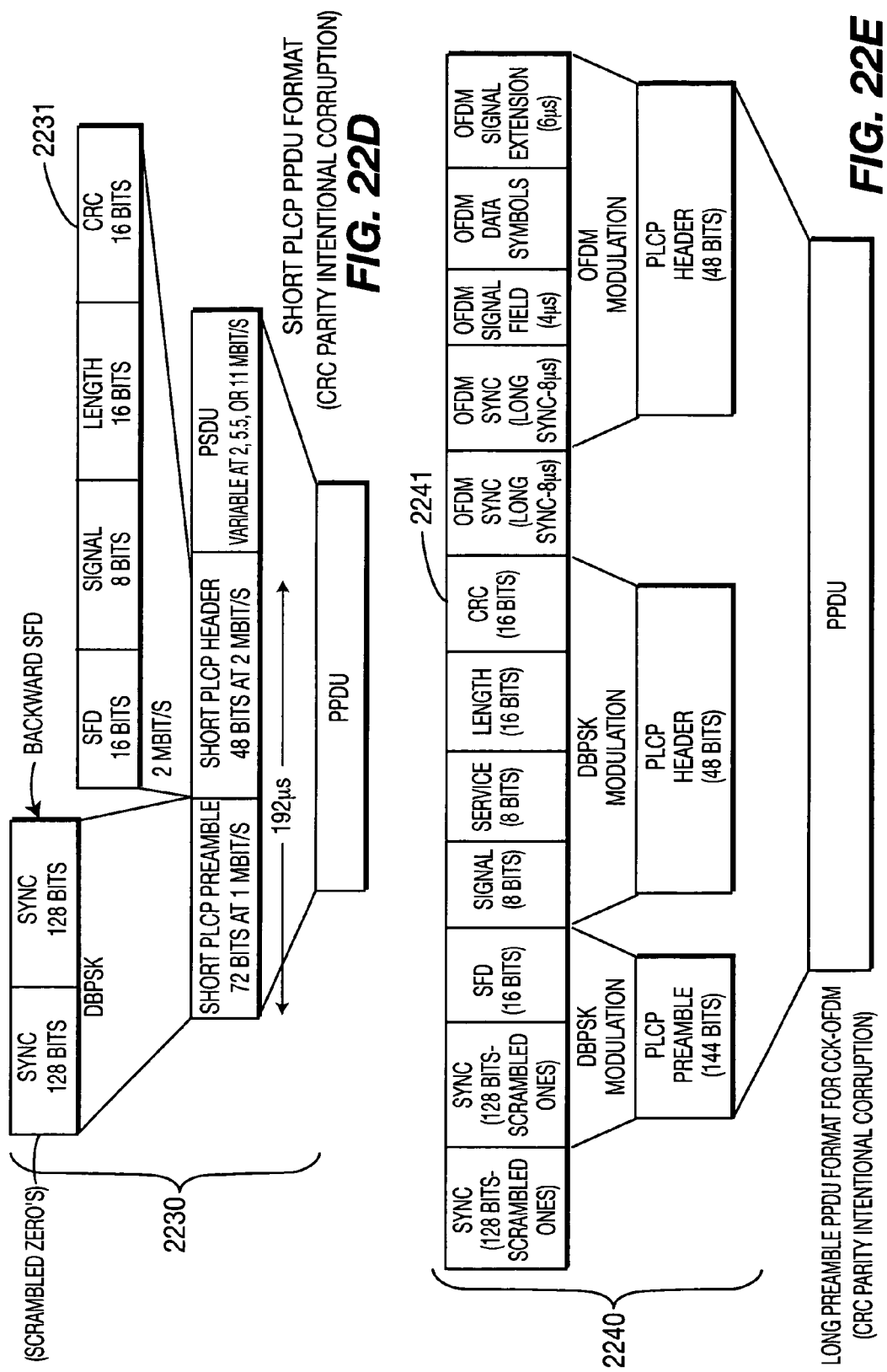

ORTHOGONAL FREQUENCY DIVISION MULTIPLEXING (OFDM) METHOD AND APPARATUS FOR PROTECTING AND AUTHENTICATING WIRELESSLY TRANSMITTED DIGITAL INFORMATION

CROSS REFERENCE TO RELATED APPLICATION

This application claims the benefit of U.S. Provisional Application No. 60/536,133 filed on Jan. 13, 2004 and U.S. Provisional Application No. 60/536,144 filed on Jan. 13, 2004 which are incorporated by reference as if fully set forth.

FIELD OF INVENTION

The present invention relates to an orthogonal frequency division multiplexing (OFDM) communication system. More specifically, the present invention is related to using OFDM-related techniques to protect and authenticate digital information transmitted to and received from a user's wireless transmit/receive unit (WTRU).

BACKGROUND

Wireless systems are susceptible in many respects. These susceptibilities are increasing as new wireless technologies are growing in prevalence. Ad-hoc networks, where individual users communicate with each other directly without using intermediary network nodes, creates new susceptibilities to the users and networks. These susceptibilities can be categorized as "trust", "rights", "identity", "privacy" and "security" related issues.

"Trust" refers to the assurance that information communicated in these systems can be shared. To illustrate, a wireless user may want to know that a communication was sent to it from a trusted source and using trusted communication nodes. The user in an ad-hoc network may have no knowledge that the communication was transferred over a hacker's wireless device with packet sniffing software. Additionally, with the use of tunneling, intermediate nodes transferring the communication may be transparent to the wireless user.

"Rights" ("rights management") refers to the control of data. To illustrate, one wireless user may have limited rights in a wireless system. However, if that user colludes (knowingly or unknowingly) with a second node having superior rights, that user may gain rights above those that the user is allowed.

"Identity" refers to the control linked to the identity of the wireless user. To illustrate, a rogue wireless device may attempt to access a wireless network by pretending to be an authorized user of the network, by using that authorized user's identity. "Privacy" refers to maintaining privacy of the individual, data and context. A wireless user may not want others to know, which web sites he/she visits and, in particular, which information is sent to these sites, such as financial information, medical information, etc. "Security" refers to the security of the data and context, such as preventing an unauthorized individual access to a wireless user's information.

To reduce the susceptibility of wireless networks, techniques such as wired equivalent privacy (WEP), Wi-Fi protected access (WPA), extensible authentication protocol (EAP), IEEE 802.11i and global system for mobile communications (GSM) based encryption are used. Although these techniques provide some protection, they are still susceptible to the trusts, rights, identity, privacy and security issues discussed above. To illustrate, although a particular wireless communication node may have the correct WEP keys to communicate with a wireless user, that user may not know whether he/she can "trust" that node.

Additionally, authentication of the user using these keys typically occurs at higher layers of the communication stack. Accordingly, even when these controls are in place, a rogue wireless user or hacker may have some (although limited) access to the communication stack. This access creates vulnerabilities, such as to denial of service attacks, among others.

Steganography is the art of passing information in a manner that the very existence of the message is unknown. The goal of steganography is to avoid drawing suspicion to the transmission of a hidden message. If suspicion is raised, then this goal is defeated. Steganography encompasses methods of transmitting secret messages through innocuous cover carriers in such a manner that the very existence of the embedded messages is undetectable. Creative methods have been devised in the hiding process to reduce the visible detection of the embedded messages.

Watermarking is a well-known technique for protecting and tracking digital information, which has been successfully exploited in the area of music and video data storage and communication. The traditional framework for watermarking consists of three elements: 1) cover signal s, 2) watermark w, 3) embedding function E and 4) secret key k. The watermarked signal is then defined as $s_w = E_k\{s, w\}$. The watermark carrying signal $s_w$ must be robust to common signal processing operations such as filtering, compression or any other operation that are the basic functionaelities of the network. Robustness is defined by the ability to extract the watermark from an altered signal. The second requirement of any watermarking scheme is imperceptibility, (i.e., the difference between s and $s_w$ must not alter the operation of the system in any perceptible manner). The watermark must also be transparent in the sense that the watermark-unaware portions of the network must be able to process $s_w$ without additional hardware or software. The watermark must also be secure even though the watermarking algorithm itself may be public. This security is frequently achieved through a secret key that is exchanged with the receiver through some form of secure key exchange.

Watermarks and signatures are techniques for adding metadata or unique information to media for signaling and/or security purposes. To reduce the susceptibilities of wireless communications, it is desirable to have alternate approaches to watermarking and adding signatures to wireless communications.

SUMMARY

The present invention is a method and apparatus for protecting and authenticating wirelessly transmitted digital information using numerous techniques. The apparatus may be a wireless OFDM communication system, a base station, a WTRU, a transmitter, a receiver and/or an integrated circuit (IC). The wireless OFDM communication system includes a transmitter which steganographically embeds digital information in an OFDM communication signal and wirelessly transmits the OFDM communication signal. The system further includes a receiver which receives the OFDM communication signal and extracts the steganographically embedded digital information from the received OFDM communication signal.

BRIEF DESCRIPTION OF THE DRAWINGS

A more detailed understanding of the invention may be had from the following description, given by way of example and to be understood in conjunction with the accompanying drawings wherein:

FIG. 1A shows a traditional digital communication transmitting system;

FIG. 1B shows a watermarking digital communication system configured in accordance with the present invention;

FIG. 4 is a block diagram of a system that performs radio frequency (RF) watermark/signature creation and extraction in accordance with the present invention;

FIG. 5 illustrates guard interval modulation used for implementing watermarking in accordance one embodiment of the present invention;

FIGS. 22A, 22B, 22C, 22D and 22E illustrate watermarking by intentionally causing CRC or Parity failure in accordance with one embodiment of the present invention;

DETAILED DESCRIPTION OF THE PREFERRED EMBODIMENTS

Figure 1C:
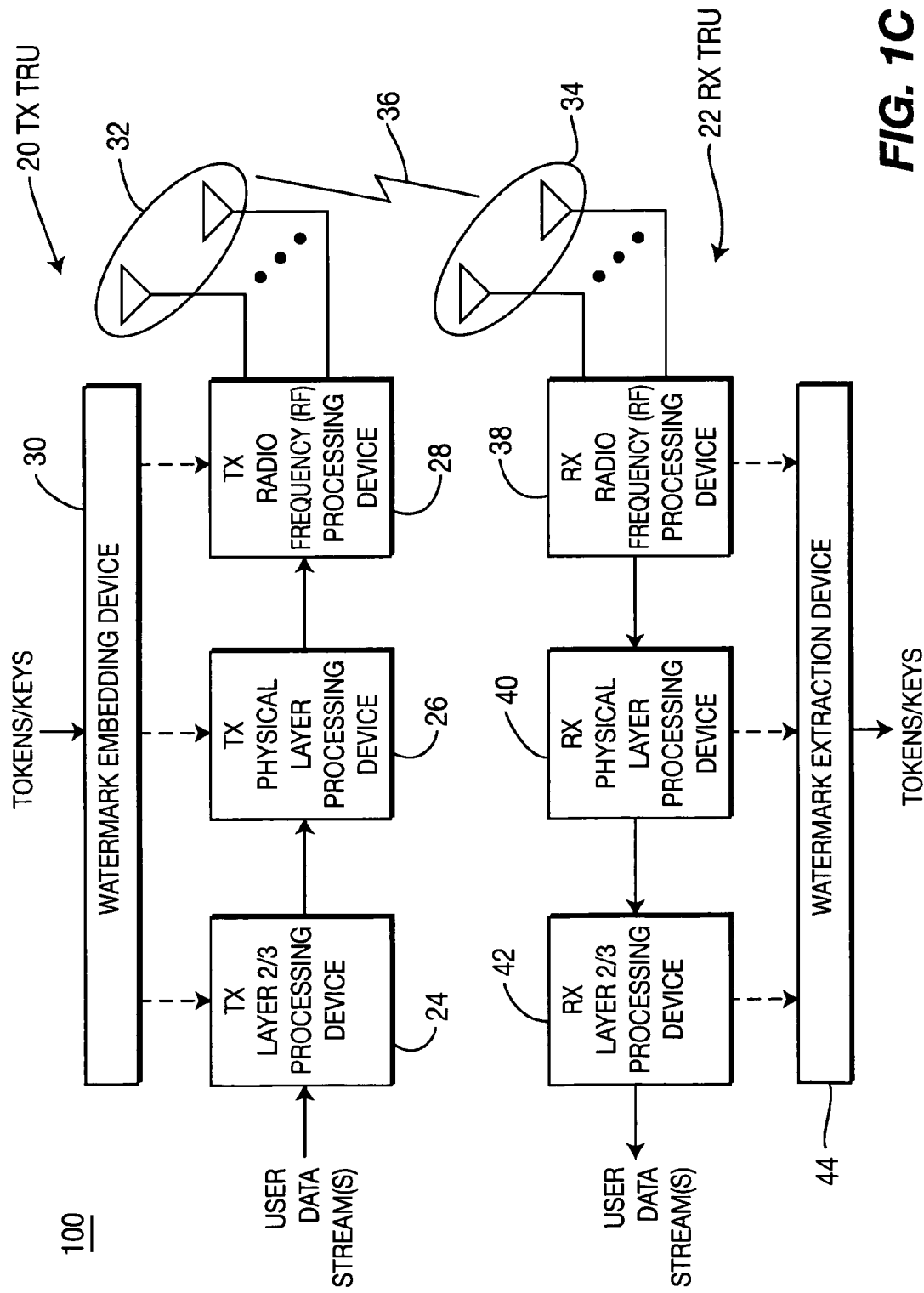
FIG. 1C is an exemplary block diagram of a wireless communication system configured in accordance with the present invention.

The present invention is applicable to communication systems using OFDM, code division multiple access (CDMA), CDMA 2000, time division synchronous CDMA (TD-SCDMA), universal mobile telecommunications system (UMTS) frequency division duplex (FDD)—time division duplex (TDD) or the like. However, the present invention is envisioned to be applicable for incorporation into any type of communication system.

The present invention may be implemented in a WTRU or in a base station. The terminology "WTRU" includes but is not limited to user equipment, a mobile station, a fixed or mobile subscriber unit, a pager, or any other type of device capable of operating in a wireless environment. The terminology "TRU" may be any type of wireless communication device (e.g., a WTRU) or any type of non-wireless communication device. The terminology "base station" includes but is not limited to a Node-B, a site controller, an access point or any other type of interfacing device in a wireless environment.

The features of the present invention may be incorporated into an IC or be configured in a circuit comprising a multitude of interconnecting components.

The present invention discloses methods to implement Information Assurance (IA); Authentication (of User, WTRU, and base station), Data Confidentiality, Data Integrity and Network Availability. The present invention discloses IA implemented based on RF watermarking. Embedded physical channels (EPCHs) can be used to transport security related data from higher layers. The EPCHs may include watermarks or signatures (permanent or temporary) associated with users, WTRUs, and/or base stations. Depending upon the security level of the EPCHs, they may be sent in the clear or encrypted by higher layer schemes. The EPCHs may also be used to transport 'challenge-words' for generating session keys, which may be used for encryption or for specifying the structure of EPCHs. The advantage of the embedded channel approach is that it is better suited for long-term continual application, such as periodic authentication etc. Furthermore, the use of EPCHs (as opposed to regular physical channels, for example) allows security operations to be performed in a manner that is transparent to higher layer data or data processing. This implies that higher layer software and applications do not need to be modified. Finally, the operational load of the higher layer processing remains unaffected.

RF watermarks/signatures are powerful concepts that can be used for authentication, data confidentiality as well as data integrity. For example, the RF watermarks/signatures could be used as keys for data encryption and for generating message authentication codes. These keys may be used by themselves or in conjunction with other security keys.

FIG. 1A shows a traditional digital communication system which receives source data $d_{source}$, (e.g., binary data). This data may represent digitized speech or image or video signals or binary text or other digital data. This data is sometimes compressed (through a process called source coding) 76 producing a compressed binary data stream, denoted as $d_{compressed}$. The compressed data $d_{compressed}$ is processed by higher open system interconnection (OSI) layers, (e.g., hyper text transfer protocol (HTTP), transmission control protocol (TCP), Internet protocol (IP) layers, etc.) 78 producing a binary data denoted as $d_{HL}$. The resulting data is now processed by the OSI layers belonging to the Radio Interface, namely Layer 3 80, Layer 2 82, Layer 1 84 and Layer 0 (RF) 86. The resulting data are denoted as $d_4$, $d_3$, $d_2$, $s_1$, and $s_0$, respectively, where $d_4$, $d_3$ and $d_2$ are binary data, and $s_1$ and so are analog signals. At the receiver side, the processing is performed similarly, but in a reverse order (Layer 0 (RF) followed by Layer 1, followed by Layer 2, followed by Layer3, followed by higher layers and then decompressed).

For the following (excluding claims), 'data' and 'signals' refer to 'binary data' and 'analog signals' respectively, unless otherwise noted.

FIG. 1B shows a watermarked digital communication system including a transmitter processing chain for embedding watermarks/signatures into communicated (binary) data and/or (analog) signals. Watermarking involves binary watermark data w, cover data or signal d or s, a watermark embedding scheme/algorithm E and a watermarked data/signal $d_w$ or $s_w$, such as per Equation 1.

$$s_w=E\{s,w\} \text{ or } d_w=E\{d,w\} \qquad \text{Equation (1)}$$

The binary watermark data may be generated by digitizing an analog watermark signal. For example, the finger print or a handwritten signature is an analog signal that can be digitized to produce binary watermark data.

Since embedding allows the watermark to be communicated along with the main source data, the embedding scheme may also be viewed as defining (perhaps implicitly) an Embedded Channel into the source data itself. As such, the embedding scheme may be said to define 'watermarking channels' or 'embedded radio channels'. If these channels are defined at the Layer 1 or Layer 0 (RF), the corresponding embedded radio channels may also be referred to as 'Embedded Physical Channels'.

The watermark/signature may be embedded in content 85 (ws) prior to compression (source coding) 86; embedded in content 87 (wc) after compression (source coding) 86; embedded during higher layer processing 88 (wHL); embedded during Layer 3 89 (w3), Layer 2 90 (w2), Layer 1 91 (w1) and Layer 0 (RF) 92 (w0).

Figure 2:
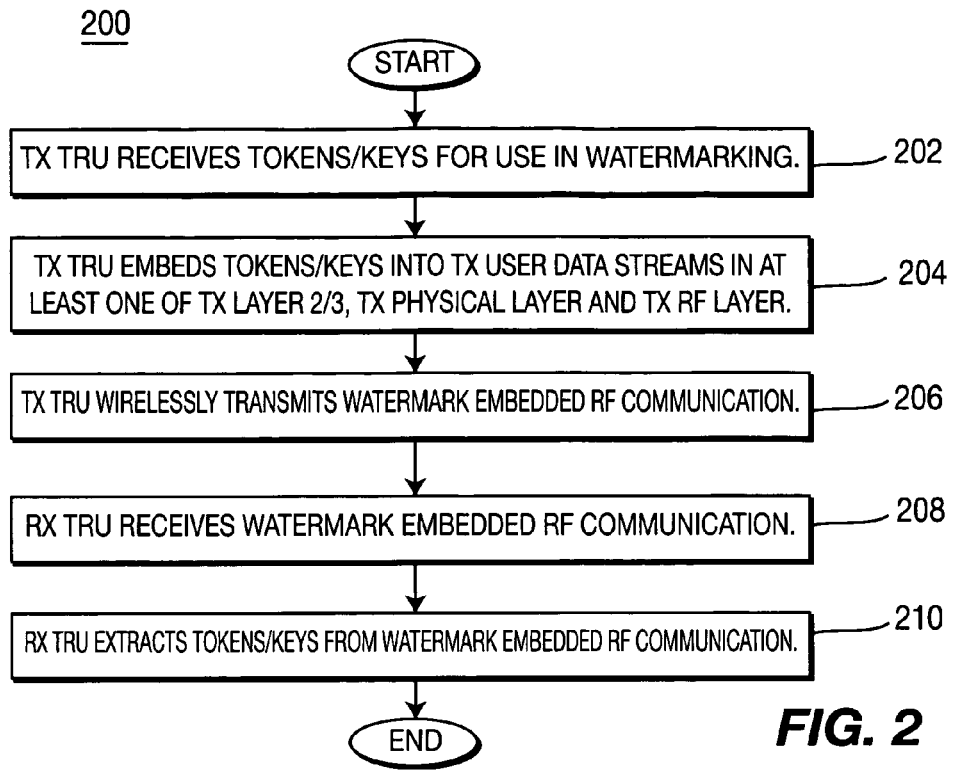
FIG. 2 is a flow diagram of a process including method steps for watermarking wireless communications in accordance with the present invention.

Although the following refers to watermarks, signatures may be used instead of watermarks in the same context for wireless communications. FIG. 1C is an exemplary block diagram of a wireless communication system 100 and is described in conjunction with FIG. 2, which is a flow diagram of a process 200 including method steps for watermarking wireless communications. A transmitting (TX) transmit/receive unit (TRU) 20 transmits user data stream(s) for wireless communication with a receiving (RX) TRU 22. The user data streams are processed using a TX layer 2/3 processing device 24 to perform layer 2/3 (data link/network) processing. Although the layer 2/3 processing is illustrated as occurring in both the TX TRU 20 and the RX TRU 22, it may alternately occur in other communication network nodes. To illustrate, in a UMTS communication system, the layer 2/3 processing may occur within a radio network controller, core network or Node-B.

The layer 2/3 processed data is physical layer processed by a TX physical layer processing device 26. The physical layer processed data is processed for radio transmission by a TX RF processing device 28.

The TX TRU 20 (or alternate network node) receives tokens/keys for producing watermarks (step 202). The tokens/keys are processed by a watermark embedding device 30, which embeds the tokens/keys as a watermark in any one or across multiple ones of the TX layer 2/3, TX physical layer and TX RF layer (step 204). The watermark embedded RF communication is transmitted by an antenna or an antenna array 32 (step 206). The watermark embedded RF communication is received over the wireless interface 36 by an antenna or antenna array 34 of the receiving (RX) TRU 22 (step 208). The received watermark embedded RF communication is RF processed by an RX RF processing device 38. The RF processed communication is physical layer processed by an RX physical layer processing device 40. The physical layer processed communication is layer 2/3 processed by an RX layer 2/3 processing device 42 to produce the user data stream(s). During any one or across multiple ones of the RF layer, physical layer or layer 2/3 processing, the embedded watermark is extracted by a watermark extraction device 44 (step 210), producing tokens/keys such as for use in authentication and other trust, rights, identity, privacy or security purposes.

The various embodiments below describe various techniques for hiding or embedding digital watermarks or signatures at the physical or RF layer of a wireless local area network (WLAN). It should be understood, however, that any of the following embodiments can be implemented on any layer within a WLAN.

To begin, a description is provided of two primary watermarking techniques: 1) hiding watermark information on embedded physical channels; and 2) imprinting watermark information directly into one or more existing physical channels so as to provide information assurance by creating an authenticating signature. In the first primary technique, a new channel is defined to carry a watermark and the watermark channel is then embedded in a physical channel. To illustrate, one technique to produce such a channel is to slowly differentially amplitude modulate physical channel(s) to produce a new watermark channel co-existing with the existing physical channel(s). Watermarks are carried by these channels. This technique can be modeled as follows. The existing physical channel(s) can be viewed as a cover signal s. The watermark is w, an embedding function is E and the embedded physical channel is EPCH. The EPCH creation techniques are described below. The watermarked signal $s_w$ may be expressed according to Equation 2 as follows:

$$s_w=E_{EPCH}\{s,w\} \qquad \text{Equation (2)}$$

Figure 3:
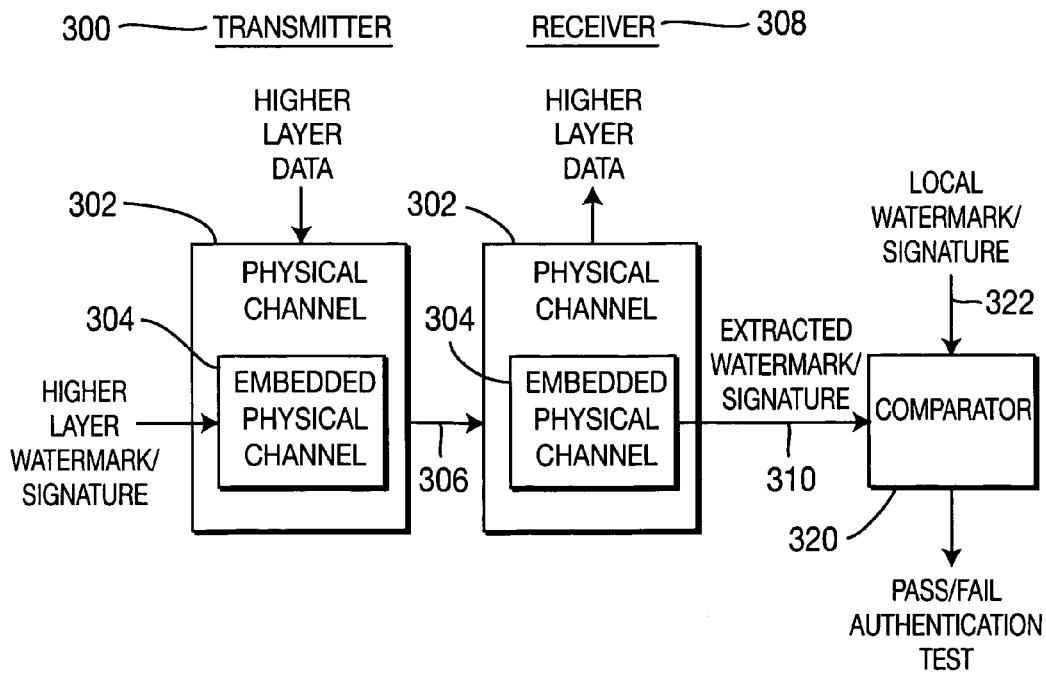
FIG. 3 is a block diagram of a system that creates physical channels in order to transmit and receive watermark/signature information in accordance with the present invention.

The first primary watermarking technique is illustrated in FIG. 3. FIG. 3 is a block diagram of a system, including a transmitter 300 and a receiver 308, for creating physical channels in order to transmit and receive watermark/signature information, (i.e., digital information). Transmitter 300 is shown transmitting higher layer data on physical channel 302. An embedding function creates embedded physical channel 304 in order to transmit watermark/signature information to receiver 308. The embedded physical channel 304 is transmitted under the cover of physical channel 302 to the receiver 308 via a transmission path 306. The receiver 308 extracts the watermark/signature information from the embedded physical channel 304 and compares the extracted watermark/signature information 310 with local (i.e., expected) RF watermark/signature information 322 of the receiver 308 by a comparator 320. If the comparison is positive, transmitter 300 is deemed a trusted data source and the watermark/signature information 306 is processed. Otherwise, the receiver 308 will reject all further data transmissions from the transmitter 300.

To enhance security further, the embedded physical channels may be encrypted to prevent a rogue TRU from being able to copy the watermark, if the rogue TRU is somehow aware of the embedded channel. These embedded channels may be used to carry security related data from higher OSI layers. To illustrate, encryption and other keys from higher layers are carried by the embedded channel. Other data carried on these channels may include "challenge words", so that a TRU can authenticate itself when challenged by another TRU or the network.

The embedded physical channels preferably occur on a long-term continual basis; although non-continuous and short term embedded channels may be used. In some implementations, the watermarking channels operate on their own without data being transmitted on the underlying physical channel(s). As a result, the underlying physical channel(s) may need to be maintained, even when they have no data to transmit. The physical channel can be viewed as a cover work for the watermarking channel. Preferably, the data transmitted on the cover work physical channel is configured so that it seems typical of data transmitted on that channel. The existence of uncharacteristic data on the channel, such as a long run of zeros, may draw an eavesdropper's attention to that channel. Such data preferably mimics data actually sent on the channel, which makes it difficult for the eavesdropper to ascertain when cover data is being transmitted. Alternately, a random bit pattern may be used on the cover channel. For encrypted or scrambled channels, a random bit pattern may provide adequate security for some implementations.

In a military application, for example, the cover data transmitted may be misleading information (misinformation). If an enemy unit encounters the communication node transferring the cover information, the enemy may leave the node intact as to attempt to decode the misleading data or cover data. In one embodiment, the generation of appropriate quality cover data is preferably automated, as manual operations to produce such data may be prone to errors and difficult to implement.

The watermarking channels can be used to increase the bandwidth of the overall communication system. The bandwidth available on the watermarking channel is (in some implementations) in addition to the bandwidth of the underlying physical channel. As a result, the overall bandwidth is increased. To add further security, when multiple watermarking channels are utilized, the watermarking data hops the channels in a predetermined or randomly determined pattern. As a result, an eavesdropper monitoring one channel may only have access to a portion of the watermark data.

The embedded physical channels can be used to allow security operations to be performed in a manner transparent to higher layers. As a result, added security can be achieved without modification to higher layer software and applications and without a change in the operational load of these layers.

In the second primary watermarking technique, the watermark is embedded (imprinted) into the physical channel. To illustrate, synchronization bits or unused bits in a physical channel can be varied to effectively carry the watermark in that physical channel. This technique can be modeled as follows. The existing physical channel(s) can be viewed as a cover signal s. The watermark is w, an embedding function is E and a secret key is k. The secret key k can be viewed as the specific physical channel embedding technique, which is described subsequently. The watermarked signal $s_w$ may be expressed according to Equation 3 as follows:

$$s_w = E_k\{s, w\} \qquad \text{Equation (3)}$$

The watermarked signal $s_w$ is preferably robust with respect to common signal processing operations, such as filtering, compression or other typical wireless network functionalities. It is also desirable that the watermarked signal $s_w$ be imperceptible. The use of the watermark does not impact the operation of the wireless system in a perceptible manner. To illustrate, components of the wireless system not aware of the watermark can process the wireless communication without a hardware or software modification. Additionally, if the watermarking technique is publicly known, it is desirable that a form of secure key is used to secure the exchange.

This second primary technique is illustrated in FIG. 4. FIG. 4 is a block diagram of a system, including a transmitter 400 and a receiver 410, which performs RF watermark/signature creation and extraction in physical channels, and authenticates received communications to determine if they were originated by a trusted source. FIG. 4 shows a higher layer controller 402 manipulating physical channel 404 with a synchronized parameter configuration 412 so as to perform RF watermark/signature creation 406 in physical channel 404 whereby watermark/signature information (i.e., digital information) is steganographically embedded. This synchronized parameter configuration 412 is known in the receiver 410 and applied to physical channel 404 upon receiving watermark signature information from the transmitter 400 via a transmission path 414 and performing watermark/signature extraction 408 whereby the steganographically embedded watermark/signature information 416 is extracted and compared with local (i.e., expected) RF watermark/signature information 418 of the receiver 410 by a comparator 420. An acceptable comparison authenticates the transmitter 400 as being a trusted data source by performing a pass/fail authentication test.

Below is a description of various other types of watermarking techniques. The watermarking techniques (one or more) discussed below may be implemented in conjunction with either of the two primary watermarking techniques discussed above.

Cyclic Prefix—Guard Intervals Between Data Packet Symbols

When an OFDM data packet is transmitted, guard intervals (GI) precede each OFDM data symbol that is to be demodulated at a receiver. These GIs are used to eliminate inter symbol interference (ISI) in the OFDM waveform by allowing the delay spread interference to have decayed enough not to corrupt the actual symbol samples used for demodulation. As a result, these GIs are typically ignored by a demodulator because they contain multi-path information from a previous symbol that is slowly deteriorating. GIs are typically an integer fraction of a full OFDM symbol, (ex: 1/5 of an entire symbol or 0.8 µs of GI and 3.2 µS of a data per symbol). Accordingly, if these GIs were grouped together, they could be used to form OFDM symbols.

The present embodiment proposes embedding extra OFDM symbols in a physical channel using consecutive groups of GIs. This concept is illustrated in FIG. 5. OFDM data packet 500 comprises data 4.0 μS symbols 502a, 502b, . . . and 502n, which each comprise a 0.8 μS GI. Low rate data is placed in the 0.8 μS of GI1 through GI8 and then the GIs are grouped four at a time so as to comprise the equivalent of two 3.2 μS OFDM symbols 504, 506.

To process OFDM data packet 500 in accordance with the present embodiment, the last 3.2 μS of each 4.0 μS OFDM symbol is presented to a fast Fourier transform (FFT) operator for demodulation. The embedded 0.8 μS GIs that are initially ignored by the demodulator are saved and stored in sequential order. These GIs are then grouped four at a time to make a 3.2 μS OFDM symbols. These OFDM symbols are then presented to the FFT demodulator to uncover the embedded watermark data.

It should be noted that since data on these GIs is generally corrupted with the multi-path from a previous symbol, it is preferable to use very simple modulation schemes on the sub-carriers intended to modulate the GI samples.

Pilot Sub-Carriers

An OFDM PLCP PPDU is split across a multitude of sub-carriers before it is transmitted. The IEEE 802.11a and 802.11g standards specify, for example, that an OFDM physical layer split a PPDU across fifty-two (52) separate sub-carriers, four of which are dedicated to be pilot sub-carriers. Pilot sub-carriers allow a demodulator to identify gain slope across a spectrum of sub-carriers and provide a coherent reference required by a demodulator to demodulate the sub-carriers carrying data. The present embodiment proposes encoding watermark information on pilot sub-carriers.

Typically, all pilot sub-carriers are encoded with known data such as, for example, a +1 or −1, to serve as a ground reference for a demodulator. This pre-determined encoding is rolled from OFDM symbol to OFDM symbol. The present embodiment proposes manipulating a specified pilot sub-carrier with information that is the exact opposite of what it expected. For instance, a pilot sub-carrier expected to be encoded with a +1 can be manipulated to include a −1 instead. Alternatively, all pilot sub-carriers can be manipulated to roll in some identified manner to flip their ground references from symbol to symbol. In another variation, alternating pilot sub-carriers are manipulated so as to transmit watermark information.

Nulling (i.e. Puncturing) Data Sub-Carriers In A Deterministic Manner

In an alternate embodiment, OFDM PPDU data sub-carriers are punctured or nulled out in a deterministic manner so as to carry watermark information or generate an authentication signature. During transmission, data bits are interleaved across sub-carriers so that if a sub-carrier were to become corrupted or lost, information carried on that lost sub-carrier can be successfully received when run through a forward error coding (FEC) decoder.

Figure 6:
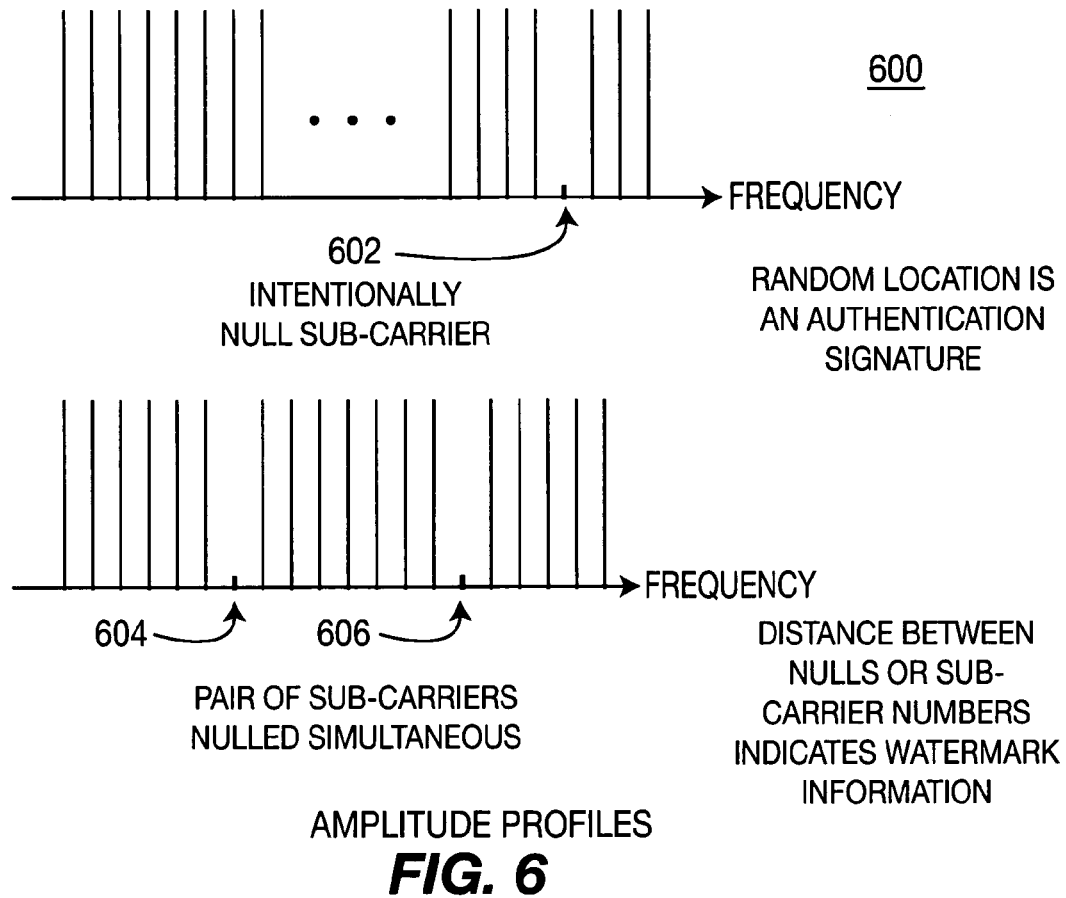
FIG. 6 illustrates watermarking by modifying sub-carrier amplitude profiles.

The present embodiment intentionally nulls out the amplitude of pseudo-randomly selected sub-carriers. The pattern of nulled-out sub-carriers serves as an authenticating signature. This concept is illustrated in FIG. 6. As indicated, sub-carrier 602 has been nulled-out. The pseudo-random location of sub-carrier 602 serves as an authenticating signature.

Alternatively, nulled-out sub-carriers can be manipulated to transmit watermark information. In the present alternative, the absence or nulling-out of specific sub-carriers or the distance between nulled-out sub-carriers can be used to transmit hidden watermark information. As shown in FIG. 6, for example, sub-carriers 604 and 606 are nulled-out. The combination of 604 and 606 being nulled-out could represent the intent to transmit, for example, a particular bit sequence such as, for example, bit sequence "101." Similarly, the distance between sub-carriers 604 and 606 could indicate the intent to transmit bit sequence "101".

Amplitude Modulate Sub-Carriers

As described above, OFDM PPDUs are split across a multitude of data sub-carriers prior to their transmission. The data sub-carriers are each modulated by one of four modulating schemes: binary phase shift keying (BPSK), quadrature phase shift keying (QPSK), 16 quadrature amplitude modulation (QAM) or 64-QAM. When generated, data and pilot sub-carriers typically have the same gain. Similarly, the data and pilot sub-carriers are generally transmitted at the same amplitude level. The present embodiment proposes making minor adjustments to the amplitude levels of sub-carriers prior to their transmission in a predetermined manner.

During transmission, an OFDM symbol occurs every 4 μS, for example, in which only 3.2 μS of information is transmitted due to guard intervals. Channel characteristics in WLANs are such that differential encoding between common sub-carriers can be utilized to transmit watermark information. The differences in sub-carrier amplitude levels from one OFDM symbol to the next can serve to form an authentication signature. An intended, (and therefore informed), receiver is able to detect the amplitude pattern and authenticate the transmitter.

Alternatively, it may be adequate to encode a single bit of watermark information on each OFDM symbol by adjusting the amplitude levels of sub-carriers to represent a zero or a one. For example, the amplitude levels of odd numbered sub-carriers can be adjusted so that they are transmitted at a slightly lower power level than that of the even numbered sub-carriers. Such an amplitude modification could be used to encode one bit of data. This concept is illustrated in FIG. 7.

Figure 7:
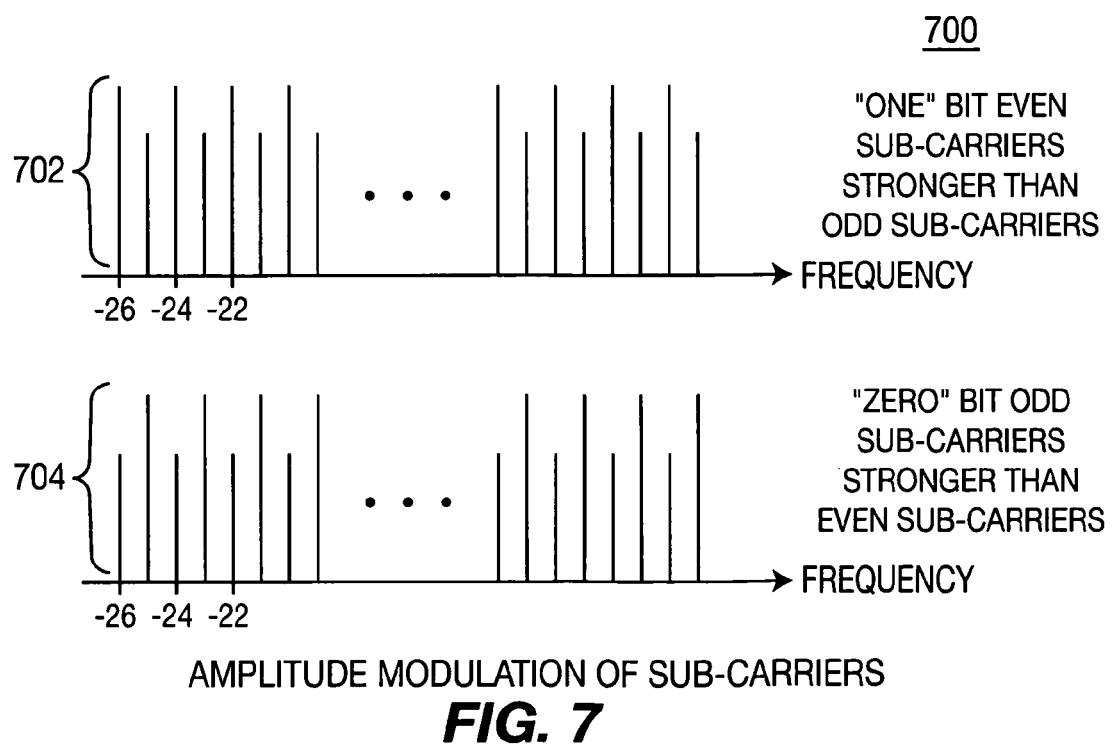
FIG. 7 illustrates watermarking by modulating sub-carrier amplitudes in accordance with one embodiment of the present invention.

FIG. 7 illustrates the amplitude modulation 702 of sub-carriers of an OFDM symbol prior to its transmission. The amplitude levels of the even sub-carriers have all been increased such that all even numbered sub-carriers are stronger than the odd numbered sub-carriers. The amplitude modulation of this OFDM symbol represents a "one" bit. Similarly, 704 represents the amplitude modulation of a subsequent OFDM symbol prior to its transmission. In this illustration, however, the amplitude levels of the odd sub-carriers have been increased such that all the odd numbered sub-carriers are stronger than the even numbered sub-carriers. Such an amplitude modulation represents a "zero" bit. Accordingly, a transmitter could send various bit messages across a waveform by merely modifying the amplitude levels of alternating sub-carriers across OFDM symbols.

Unused Sub-Carrier Locations

Figure 8:
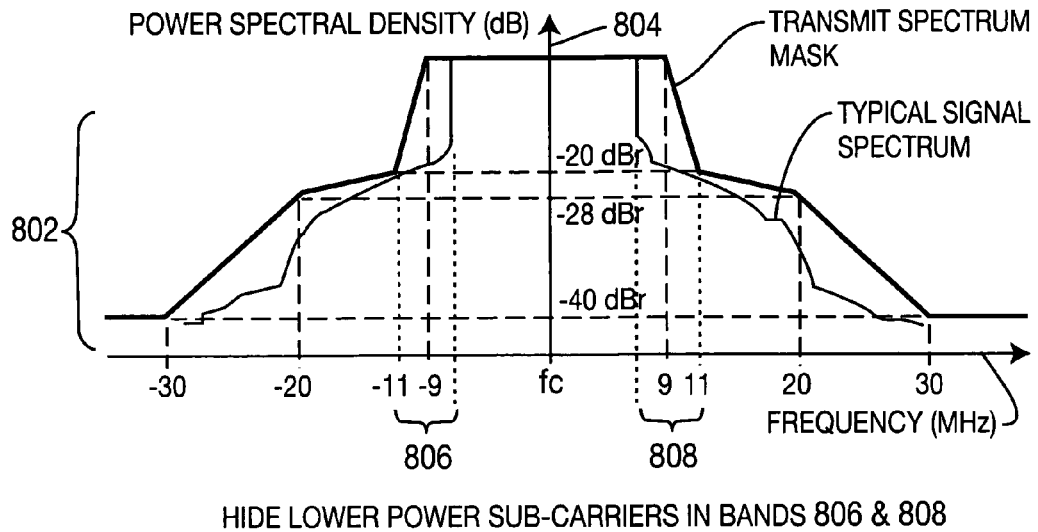
FIG. 8 illustrates embedding low power sub-carriers in unspecified frequency bands in accordance with one embodiment of the present invention.

In an OFDM system, multiple sub-carrier frequencies are used to simultaneously transmit signals in parallel. Each signal is transmitted on its own frequency or sub-carrier, which may be modulated by data. These sub-carriers can be spaced close to one another because their frequencies are orthogonal, i.e., mathematically perpendicular, which means they will not interfere with one another. Each group of orthogonal OFDM sub-carriers is centered about a center frequency ($f_c$) as illustrated in FIG. 8. FIG. 8 shows the relationship between sub-carrier frequencies and power spectral density (dB) with respect to a center frequency as specified by IEEE 802.11a (802). As a result of modulating a center frequency ($f_c$), spectral content beyond +/−9 MHz includes unwanted effects of modulation. A transmit spectrum mask (bold line in Figure) ensures that a neighboring center frequency (which may be modulated) is far enough down in power so as not to corrupt the frequency spectrum reserved for data. This reserved spectrum ranges from between −11 MHz and +11 MHz.

The present embodiment proposes to add unspecified sub-carriers between the edge of the specified carriers and the +/−11 MHz boundary of the spectrum mask. These additional, peripheral sub-carriers may be added in unspecified frequency positions for the purpose of embedding low rate watermark information. Referring back to FIG. 8, low power sub-carriers can be hidden, for example, in frequency locations 806 and 808.

To further illustrate, IEEE 802.11a and 802.11g specify that an OFDM physical layer splits an information signal across 52 sub-carriers for transmission. The present embodiment could add a $53^{rd}$ or $54^{th}$ (or more) sub-carrier at a peripheral frequency range and embed low power watermark information in these unspecified sub-carriers.

Scrambling Code

An alternate embodiment proposes modifying a polynomial for a given scrambling code as a means of transmitting watermark information. Phase reference of pilot sub-carriers are determined by a scrambling sequence that defines in which constellation quadrant each of the pilot sub-channels is located. The scrambling sequence polynomial could be modified in a predetermined manner such that only a cognizant receiver is able to unscramble the sequence. Data packets successfully descrambled according to the modified scrambling sequence are deemed to originate from an authenticated source.

It should be noted that modification of a polynomial is applicable to cyclic redundancy checks (CRC) (discussed below), calculation polynomials, PNs, scrambling codes, and the like.

Figure 9:
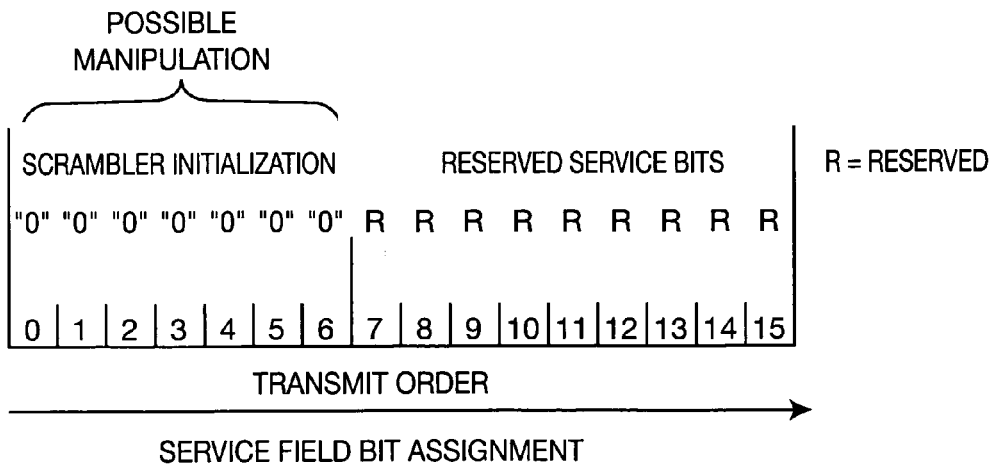
FIG. 9 shows a Service field of an OFDM physical layer convergence procedure (PLCP) protocol data unit (PPDU) in accordance with one embodiment of the present invention.

As an alternative, one or two of the synchronization bits of a scrambling code can be manipulated so as to not affect the synchronization function. Rather, these one or two bits of manipulated information could be used to carry watermark information to a receiver. As an example, FIG. 9 shows an OFDM Service field with its bit assignments. Any of the first seven bits, bit-0 through bit-6, are candidates for possible manipulation in accordance with the present embodiment. Unlike the previous embodiment, this scrambling code manipulation is not intended to confuse a non-intended receiver. Rather, this embodiment proposes to embed watermark information that can be received and descrambled by standard compliant receivers, yet only detectable by receivers looking for the embedded watermark information.

Vary Synchronization Bits

Most OFDM data packets have preambles with scrambler initialization bits (ex: bit 0 to bit 6 in Service field) to synchronize data scrambling. Scrambling data prevents long runs of ones or zeros (which impedes transmission) by equally distributing ones and zeros. A scrambler is synchronized by a default set of synchronization (sync) bits, such as for example, a string of zeros. These synchronization bits actually aid receivers in signal acquisition in that they "alert" the receivers that a message is about to arrive. Sync bits synchronize various receiver functions such as, for example, detection, automatic gain control (AGC), fine and coarse frequency, timing, channel estimation, diversity decisions, and the like. Once this synchronization (i.e., "training") period has ended, the OFDM data packets indicate to receivers that a message is about to follow.

The present embodiment proposes pseudo-randomly varying the number of sync bits or training symbols periodically or according to message embedding pattern. For added security, the sync bits and training symbols may be scrambled.

However, it should be understood that even if left unscrambled, the mere increase or decrease in the number of OFDM sync bits or training symbols can serve as authenticating watermark signatures or watermark information. Additionally, the pseudo-random synchronization sequence of the present embodiment may be altered for every data packet transmission according to a predefined method. Advantages of the present embodiment include preventing eavesdroppers from achieving frequency or timing synchronization. In addition, the present embodiment can potentially secure a WLAN link at the lowest possible level in a protocol stack.

Only an intended receiver in possession of the modified synchronization sequence can descramble and properly process transmitted data. As a result, the receiver can authenticate the origin of received transmissions. The implemented pseudo-random synchronization sequence is defined and controlled by a higher protocol layer in a transmitter and signaled to a receiver through a receiver's higher protocol layer. It should be noted that receivers without the appropriate scrambling initialization sequence will likely ignore transmission with a modified synchronization sequence. If such transmissions are not ignored, however, the data will be scrambled and unintelligible.

Figure 10A:
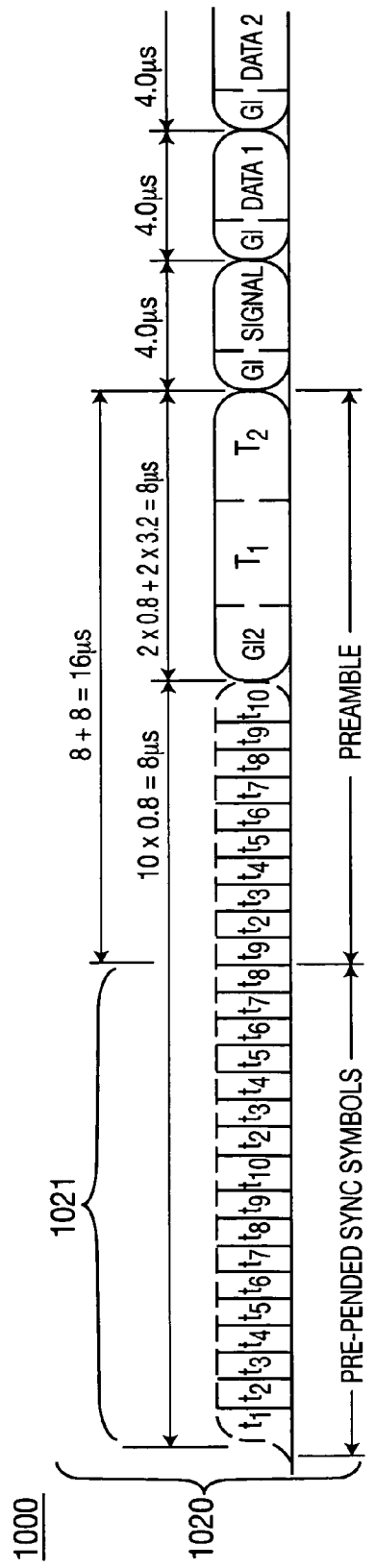
FIG. 10A illustrates watermarking by pre-pending synchronization symbols to an OFDM PPDU preamble in accordance with one embodiment of the present invention.
Figure 10B:
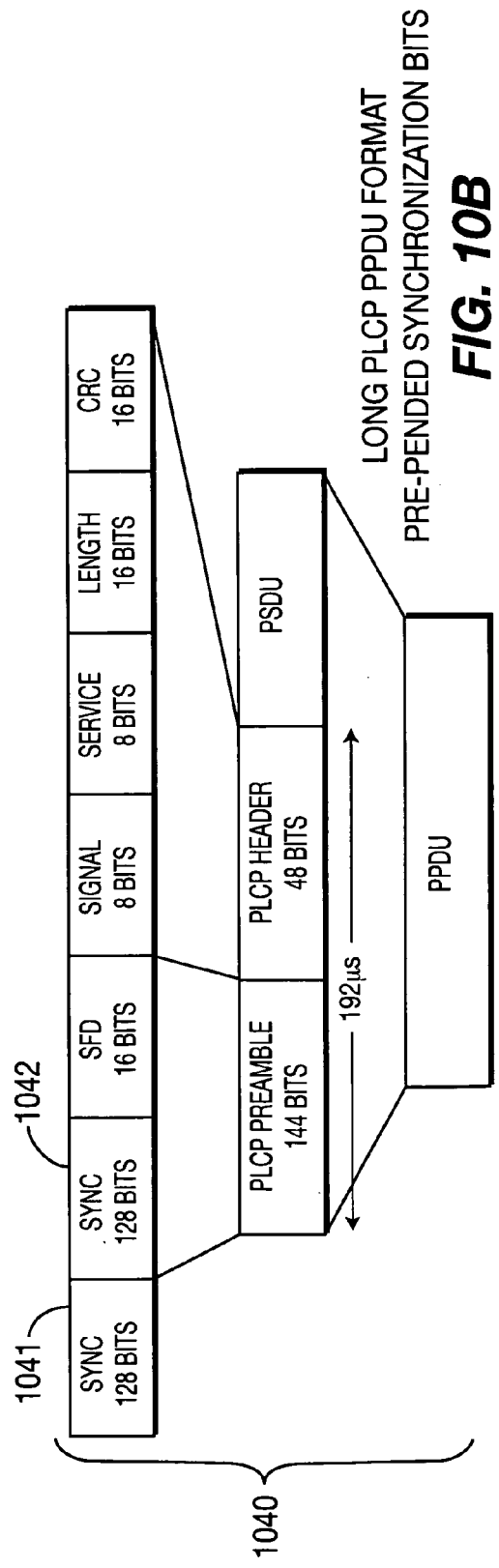
FIG. 10B illustrates watermarking by pre-pending synchronization bits to an OFDM PPDU in long PLCP format in accordance with one embodiment of the present invention.
Figure 10C:
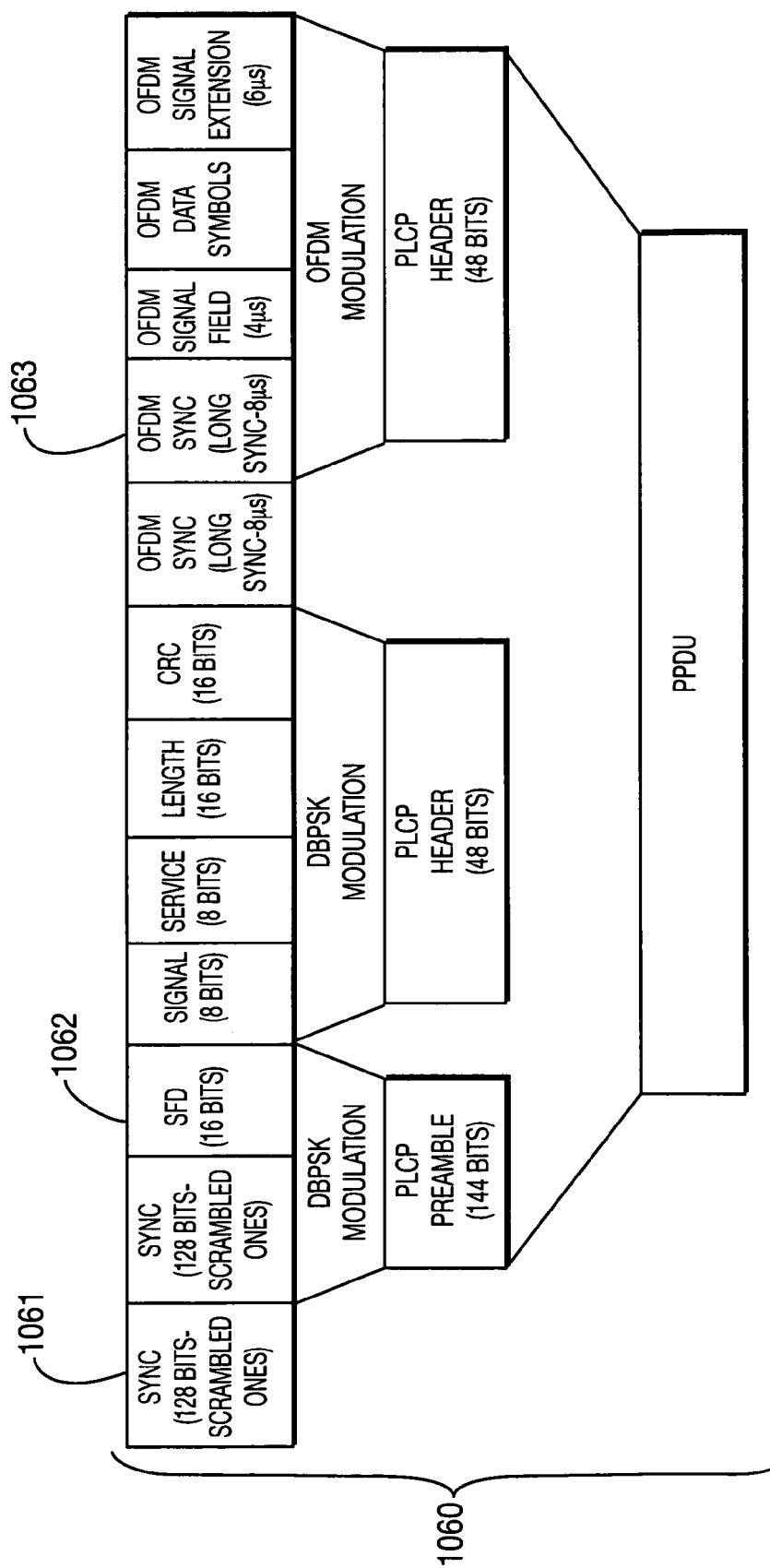
FIG. 10C illustrates watermarking by adding extra synchronization bits to an OFDM PPDU in a long preamble format for complementary code keying (CCK) OFDM in accordance with one embodiment of the present invention.

To illustrate, FIGS. 10A, 10B and 10C show various OFDM PPDUs 1020, 1040, 1060, respectively with modified preamble sync bits in accordance with the present embodiment. FIG. 10A shows OFDM PPDU 1020, wherein seventeen additional short sync symbols 1021 are pre-pended to the front of its preamble. FIG. 10B shows OFDM PPDU 1040 wherein an additional 128 sync bits 1041 are prepended to the front of its preamble. All 256 sync bits (1041 and 1042) are manipulated with a predetermined scramble pattern. OFDM PPDU 1060, shown in FIG. 10C, is a third example of an OFDM PPDU wherein an additional 128 sync bits 1061 are prepended to the front of its preamble and an additional long training symbol 1063 is included between the PLCP header and the PSDU. All 256 sync bits (1061 and 1062) are manipulated according to a predetermined scrambling pattern.

It should be noted that the number of pre-pended bits are adjustable and do not necessarily have to have values of 8, 16, or 128 bits, as illustrated in FIGS. 10A through 10C. In addition, although FIGS. 10A-10C illustrate PPDUs in which the sync bits are scrambled, it should be noted that even if a PPDU's sync bits are left unscrambled, the mere increase or decrease in the number of OFDM sync bits or training symbols can serve as authenticating watermark signatures.

Unused Bits in PLCP

Figure 11A:
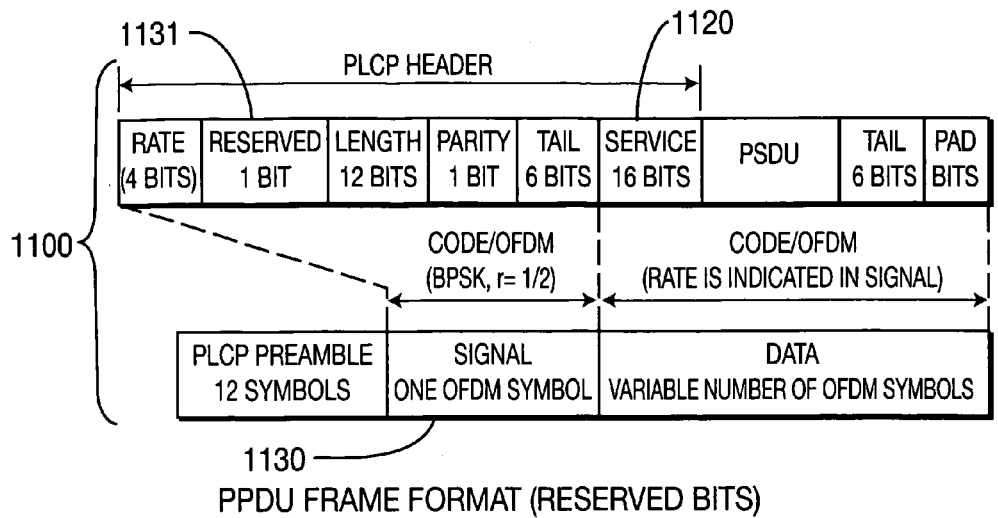
FIGS. 11A, 11B and 11C illustrate watermarking by utilizing OFDM reserved bits in accordance with one embodiment of the present invention.

Most OFDM data packets include header fields that provide information such as data rate, packet length, service information, and the like. For example, IEEE 802.11 specifies that each PLCP PPDU frame have a PLCP header. Such a PLCP header includes a Rate field (4-bits); a Reserved field (1-bit), a Length field (12-bits) and Parity field (1-bit) and a Service field (16-bits). (See IEEE 802.11a PPDU 1100 in FIG. 11A). A number of the bits defined in these header fields, however, are unused. The present embodiment proposes to utilize these unused bits to create watermark embedded physical channels such that receivers are able to demodulate these channels even if the presence of the watermark information is unknown.

Alternatively, these unused bits can be utilized to generate authentication signatures. Intended receivers demodulate embedded physical channels seeking to uncover the hidden watermark information. The presence of watermark information is used to authenticate the transmitter. Absence of hidden watermark information denotes an unknown or unauthorized transmitter.

Figure 11B:
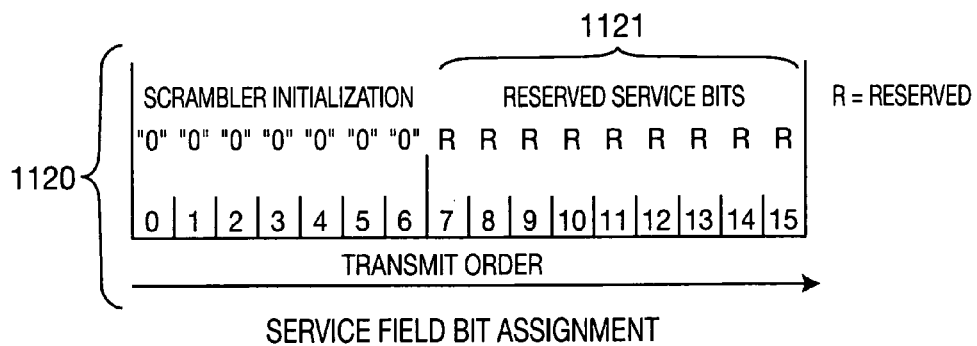
Figure 11C:
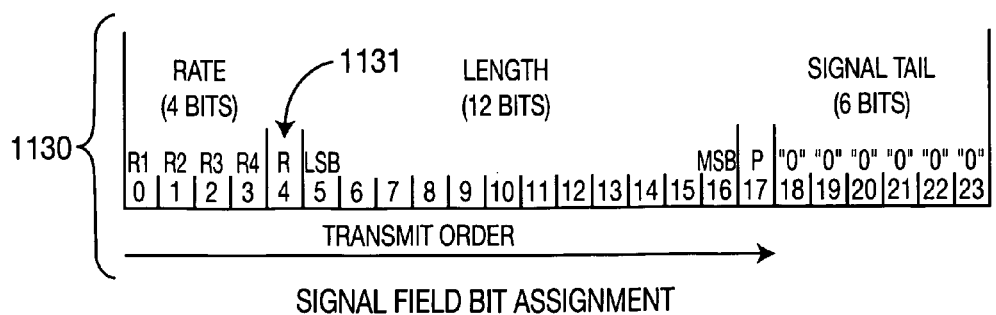

One example of the present embodiment utilizes reserved bits 1121 or 1131 within the Service field 1120 and Signal field 1130, respectively. A Service field 1120 and a Signal field 1130 of OFDM PPDU 1100 are illustrated in FIGS. 11B and 11C, respectively, with their respective bit assignments. Service reserved bits are denoted by 1121 and the Signal reserved bit is denoted by 1131. Reserved bits 1121 and/or 1131 can be toggled in a predetermined pattern so as to generate a watermark. A receiver expecting the reserved bits to be toggled can authenticate the transmitter. Alternatively, the reserved fields can be utilized to embed a bit of watermark information per reserved bit.

Unspecified Bit Maps

Figures 12A, 12B:
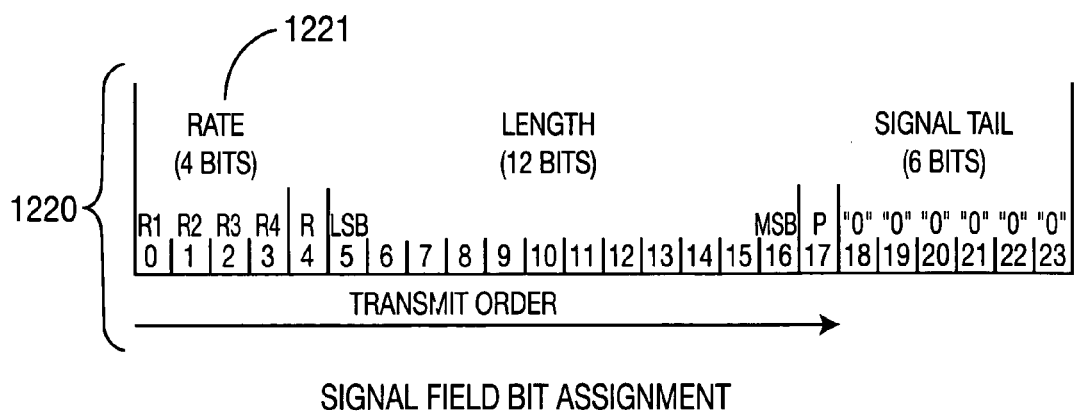
FIG. 12A illustrates an OFDM Rate field in accordance with one embodiment of the present invention.
FIG. 12B illustrates a table showing bit patterns with their corresponding data rates and bit patterns not currently specified in accordance with one embodiment of the present invention.

Another embodiment utilizes a Rate field of a PLCP header. A Rate field provides rate information by mapping specified bit patterns to pre-defined rates. For example, IEEE 802.11a and 802.11g utilize four bits with a total of 16 binary combinations to provide rate information. As shown in FIG. 12A, the four bit Rate field 1221 is part of the Signal field 1220. Although there are 16 possible bit rate combinations (0000 through 1111), only the eight odd numbered bit patterns are used to specify rate information. The table 1226 shown in FIG. 12B includes the eight utilized bit patterns and their corresponding rate information. The even numbered patterns, i.e, 0000, 0010, 0100, 0110, 1000, 1010, 1100, and 1110, are not utilized.

The present embodiment proposes to map these remaining, unspecified bit patterns to an already specified bit pattern. For example, rather than utilizing bit pattern 1101 to represent a rate of 6 Mbits/s, bit pattern 1100 could be specified in its place. A receiver would know to map rate pattern 1100 to rate pattern 1101 or to an information stream which indicates the desired 6 Mbit/s rate information. Only messages received with the unspecified even numbered bit patterns will be processed as originating from authenticated sources.

Alternatively, a rate field in an OFDM data packet can intentionally be incorrectly mapped at a predetermined time or at specified time intervals in order to authenticate the data source. Additionally, by having two pit patterns that map to the same desired rate information, the least significant bit (LSB) that creates an even or odd table entry could be used to encode a single bit "one" or "zero" of watermark information per PPDU.

Tail Bits

Figure 13A:
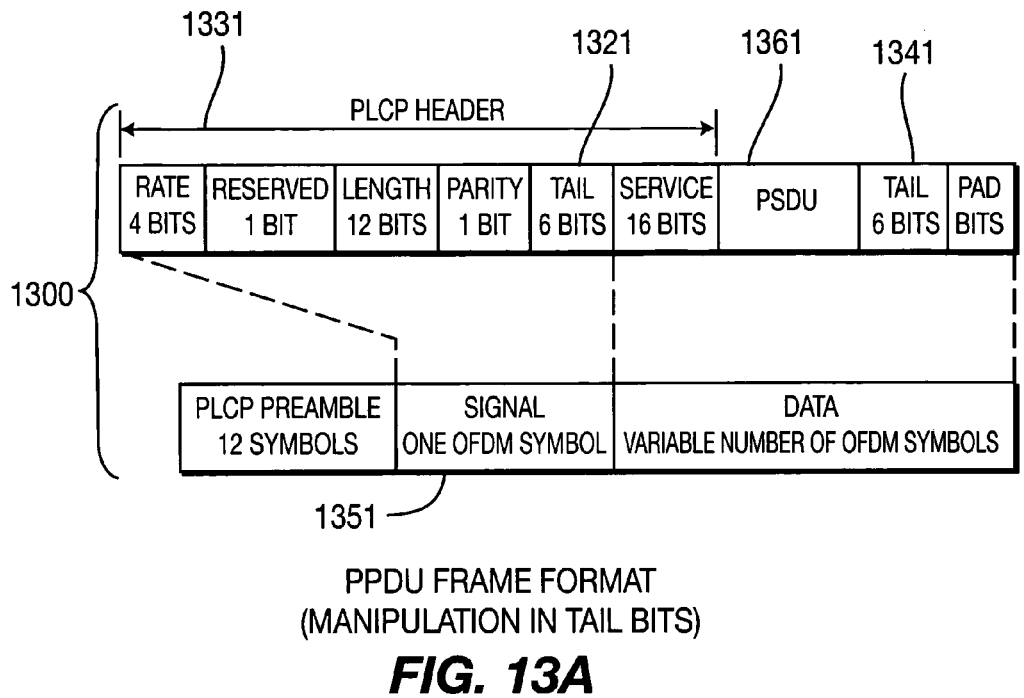
FIGS. 13A and 13B illustrate watermarking by manipulating OFDM tail bits in accordance with one embodiment of the present invention.
Figure 13B:
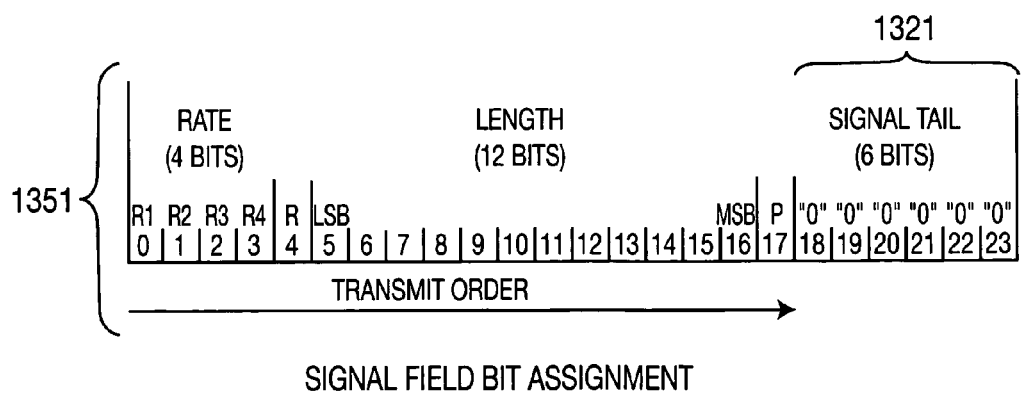

Tail bits (i.e., 0 bits) are inserted into the PLCP header portion of an OFDM PPDU, just before the Service field in order to facilitate a reliable and timely detection of the data packet's Rate and Length fields. Examples of these PLCP header tail bits are shown in FIGS. 13A and 13B. Tail bits 1321 are shown inserted between the Parity and Service fields of PLCP Header 1331. Similarly, an expanded view of Signal field 1351 is shown (see FIG. 13B) with its Rate, Length, and Signal Tail bit assignments. As FIG. 13B illustrates, the depicted Signal tail 1321 has six tail bits, all with a value of "0".

A second set of tail bits 1341 is shown appended to the physical layer sublayer service data unit (PSDU) 1361 of OFDM PPDU 1300 (see FIG. 13A). These tail bits are appended after the PPDU 1300 has been scrambled in order to return the convolutional encoder to a "zero state." As shown in FIG. 13A, six of these convolutional tail bits 1341 are appended to PSDU 1361 in PPDU 1300.

The present embodiment proposes to manipulate either the header tail bits or the convolutional tail bits (or both) so as to encode them with watermark information. As an example, specific, predetermined tail bits can be flipped from zeros to ones in a predetermined pattern to form an embedded physical channel wherein the tail bit pattern represents a bit or bits of data.

Alternatively, either set of tail bits can be manipulated so as to generate an authorization signature. As long as both the transmitter and receiver know what known state the decoder wants to achieve, these tail bits can be manipulated without affecting the decoding function. As an example, a set of tail bits can be flipped from all zeros to all ones.

Pad Bits

Figure 14:
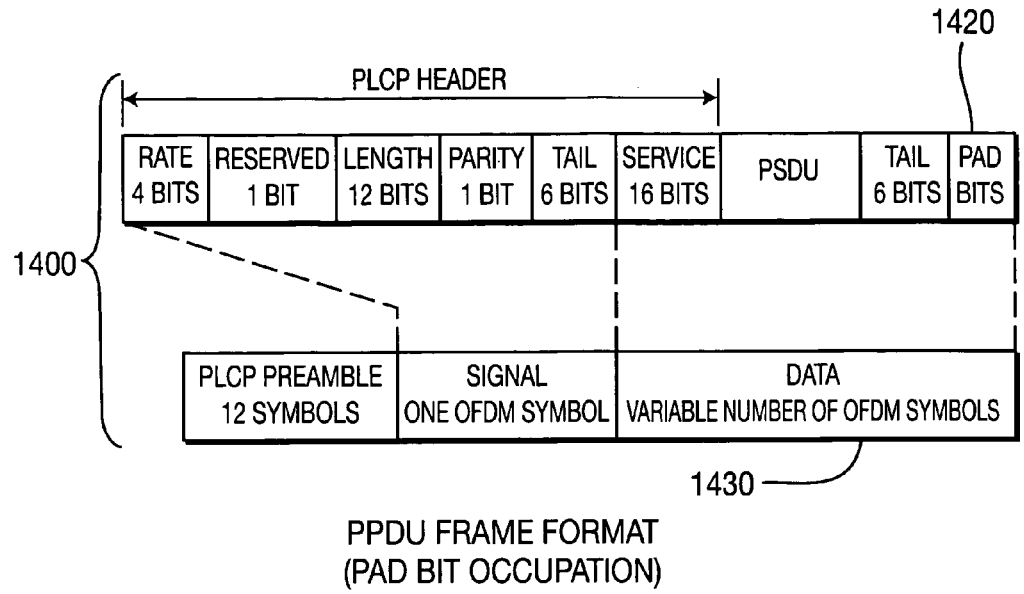
FIG. 14 illustrates watermarking by manipulating OFDM pad bits in accordance with one embodiment of the present invention.

The number of data bits in an IEEE 802.11a OFDM Data field (Service field+PSDU) is a multiple of $N_{DBPS}$, the number of data bits in an OFDM symbol (i.e., 48, 96, 192, or 288 bits). After a PSDU has been appended to a Service field to form an OFDM Data field, the resulting bit string is extended with pad bits (at least six to accommodate convolutional tail bits discussed above) so that the resulting string length is an integer multiple of $N_{DBPS}$. An OFDM PPDU 1400 is shown in FIG. 14 wherein pad bits 1420 are appended to the PSDU to create the Data field 1430 so that its length is a multiple of $N_{DBPS}$.

These pad bits are used only as space holders and are typically given values of zero. The present embodiment proposes encoding these pad bits with watermark information. Since a receiver can determine how many of these pad bits are being utilized for tail bits, a subsequent demodulation can be used to retrieve any non-tail bit encoded pad bits. (It is noted that the demodulator can still traverse a Viterbi trellis with the existing six tail bits). The receiver can then combine watermark information from multiple OFDM data burst to form a complete watermark message. The option also exists not to encode these pad bits.

Alternatively, these pad bits can be manipulated so as to create an authentication signature.

Time Diversity Delay Modulation

In an OFDM system, relative time is irrelevant because information is transmitted in data packet bursts. However, if the start of orthogonal codes is staggered by one shift, (similar to a temporal delay), such a delay could serve as an authenticating signature. Such a delay does not affect a receiver. The receiver can still receive the delayed OFDM symbols, only they will arrive a modified times.

Alternatively, OFDM symbols can be delayed such that the delay periods between data packet bursts represent watermark information. So long as a receiver is aware of the delay patterns, or can detect such patterns, it can authenticate and process the watermark information.

Frequency Hopping

An alternate embodiment utilizes OFDM carrier frequencies to transmit watermark information. In current WLAN implementations, receivers must acquire a RF carrier frequency offset of a transmitter for every OFDM data packet transmission. The present embodiment proposes to modify this transmitted carrier frequency by adding or subtracting a few hundred or thousand hertz within an automatic frequency control (AFC) capture range in a predetermined pattern. The pattern in which the center frequency fluctuates over time serves to provide hidden bit information, i.e., a watermark. For instance, determining in a receiving demodulator that a carrier frequency is higher than expected (or the last data packet) could represent a "one", whereas receiving a carrier frequency that is lower than expected (or the last data packet) could be used to represent a "zero".

Figure 15:
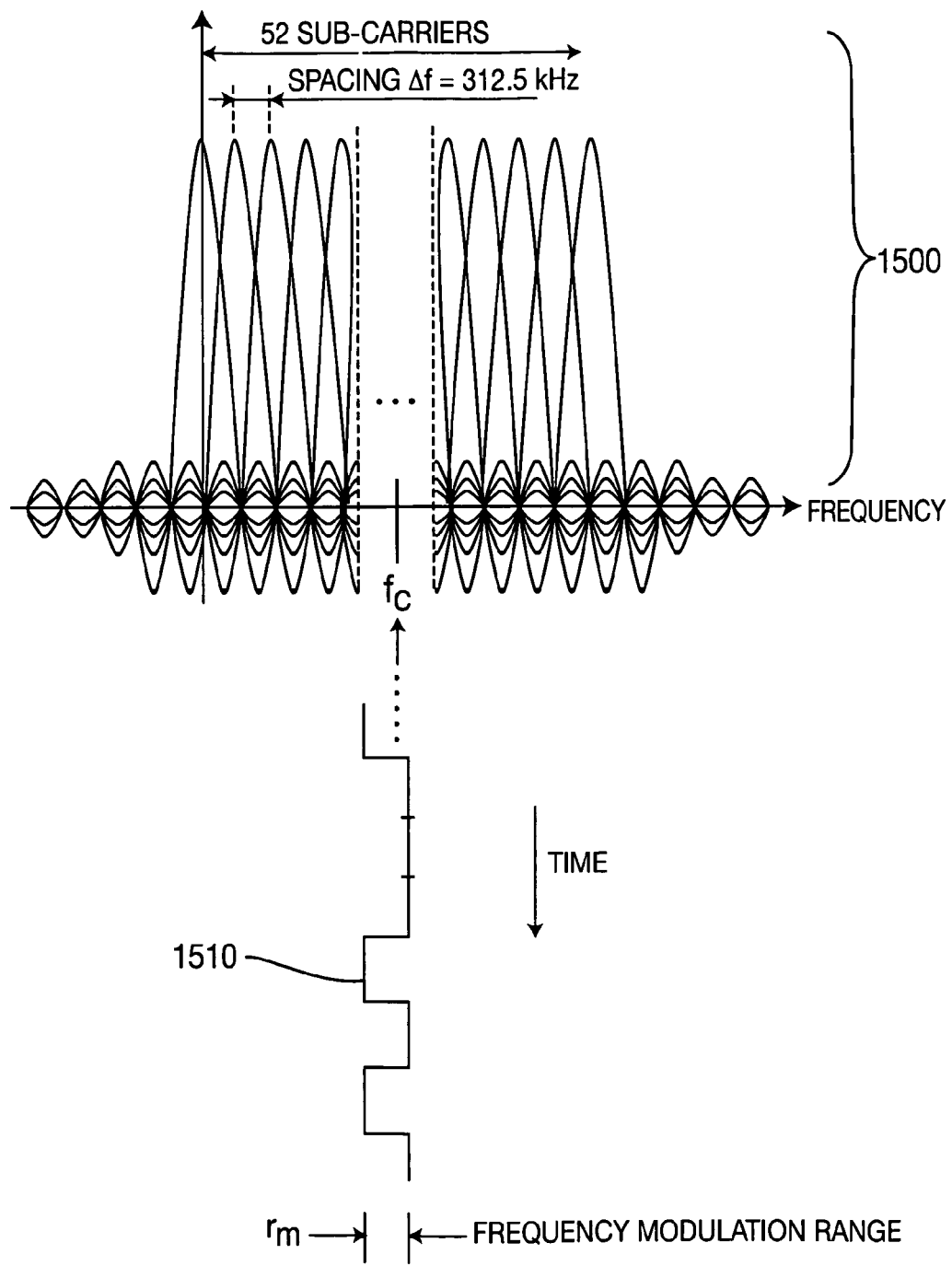
FIG. 15 illustrates watermarking by modulating carrier frequency in accordance with one embodiment of the present invention.

It should be understood that the present embodiment does not propose changing channels, but rather modifying a center frequency several hundred or thousand hertz while staying within a specified capture frequency range. This concept is illustrated in FIG. 15. As the Figure illustrates, OFDM waveform 1500 has a carrier frequency $f_c$ which is modulated within a modulation range $r_m$. Overtime, carrier frequency $f_c$ is modulated to form predetermined frequency pattern 1510 within modulation range $r_m$. This pattern transmits watermark information.

To uncover hidden watermark information, a higher layer must know the origin of a given data transmission in order to properly assign the information bits, (eg., high frequency=+1, low frequency=0). Depending on frequency resolution, more than one bit of information can be encoded per data packet. Such an embodiment would distinguish between carrier frequencies that are, for example, very much higher than expected, higher than expected, very much lower than expected or lower than expected, yet within the required capture range. Corresponding bit information could be represented as follows: very much higher=11; higher=10; lower=01; and very much lower=00.

Alternatively, carrier frequency could be intentionally altered from data packet to data packet so as to produce a predetermined pattern over time. This pattern serves as an authenticating signature and could be used to identify friendly transmitters.

Multi User OFDM w/Channelization Code

IEEE 802.11 specifies that all sub-carriers of a given OFDM data packet be transmitted to the same user. Other OFDM physical layer standards specify that only a portion of OFDM sub-carriers shall be transmitted to one user with the remainder being transmitted to other users (multi users). The present embodiment proposes creating an embedded physical channel or creating an authenticating signature by alternating the sub-carriers dedicated to specified users in a predetermined manner.

Code Puncturing

Code puncturing is a method utilized to increase the data transmission rates of OFDM waveforms. A forward error coding (FEC) encoder creates parity bits on a transmitter side and the transmitter discards specific encoded bits. Standard FEC schemes perform code puncturing at rates of 1/2, 2/3, and 3/4. This allows more information to be transmitted and hence, received. A receiver, aware of the rate at which these encoded bits are being discarded, 'replaces' the discarded bits with either a 0 or 1, thereby recreating the discarded bits.

The present embodiment proposes performing a secondary code puncturing scheme on a portion of data already encoded with an FEC scheme. This secondary code puncturing is performed at a higher coding rate thereby puncturing or discarding additional bits of information. These additional discarded bits are then replaced with watermark information such that all of the data appears to be encoded at the original, lower FEC rate. The encoded data is then transmitted as an embedded physical channel at the original, lower FEC rate.

Figure 16:
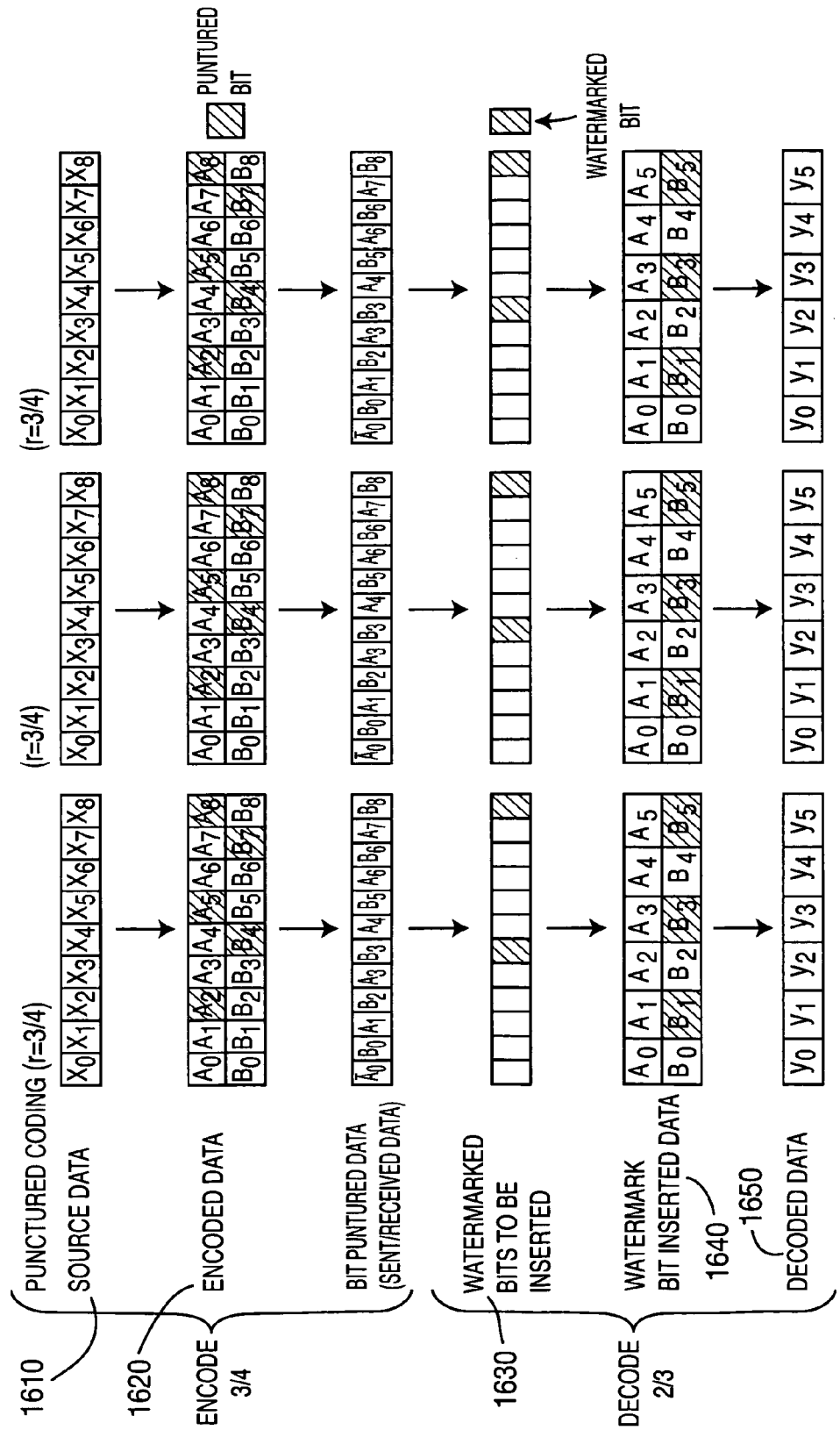
FIG. 16 illustrates code puncturing in accordance with one embodiment of the present invention.

This concept is illustrated in FIG. 16. Data bits 1610 are encoded at 3/4 FEC rate to produce encoded data bits 1620. Encoding data bits 1610 at a higher rate than that which will be used to decode on a receiving end creates additional space for watermark information. This additional space is replaced with watermark inserted bits 1630 to form watermark bit inserted data. The now watermark embedded data is then transmitted, received and decoded as an EPCH at the original, 2/3 FEC rate 1640 to yield decoded data bits 1650 and the watermark bits.

The structure of this EPCH, (i.e., specification of the watermark carrying blocks, FEC rates, etc.), is determined in the transmitter and signaled to an intended receiver by a higher layer protocol. This information may be randomized and exchanged using various encryption protocols to increase the security of the transmission.

Pulse Shaping

Figure 17:
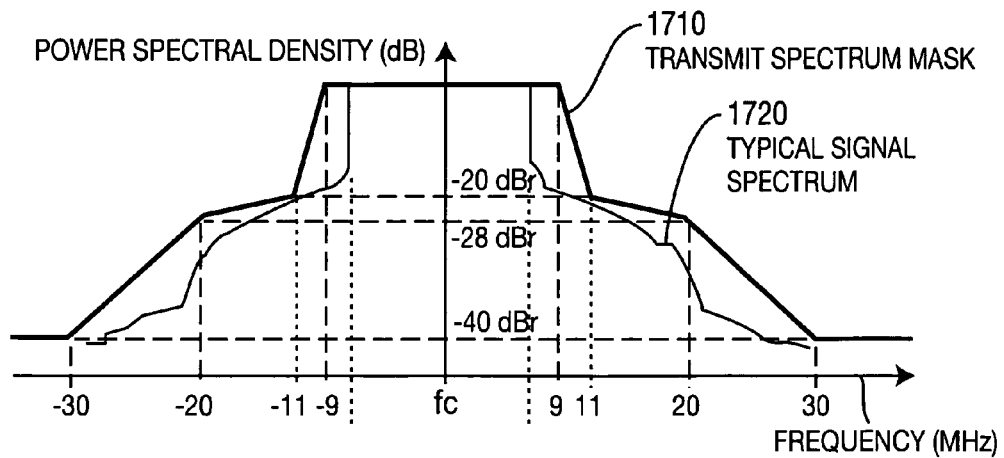
FIG. 17 illustrates pulse/spectrum shaping in accordance with one embodiment of the present invention.

The RF spectrum of WLAN is specified in IEEE 802.11, for example, within certain tolerance limits, so that more than one set of pulse shaping filters can satisfy the standard's requirements. This provides an opportunity to predefine a number of filter coefficients. The present embodiment proposes cycling through these predefined filters in a pseudo-random manner in order to modify the shape of a pulse. FIG. 17 shows a transmit spectral mask 1710 and a typical signal spectrum 1720. The present embodiment proposes predefining a number of filter coefficients that modify the pulse shape of the signal spectrum 1720 while continuing to comply with the specified transmit spectrum mask 1710.

It should be understood that the filter coefficients should be selected so as to cause only subtle variations in the shape of the pulse 1720. An RF watermark can be created through these subtle variations of the pulse shaping filters. A receiver, aware of the predefined pulse shapes, analyzes the received spectrum and identifies/authenticates their origin. This technique makes it difficult for an intruder to spoof an RF signal.

Alternatively, one could manipulate the discrete time windowing function so as to produce an authenticating watermark signature.

DC Term

Figure 18:
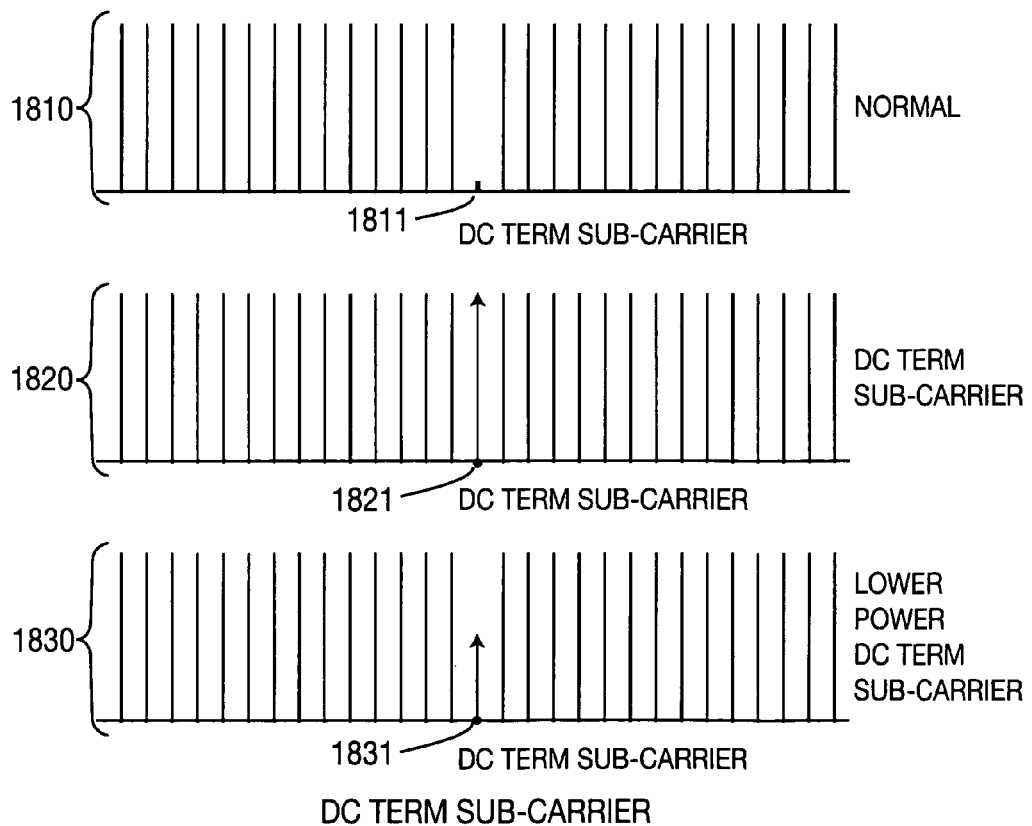
FIG. 18 illustrates watermarking utilizing a low power DC term sub-carrier in accordance with one embodiment of the present invention.

Typically, OFDM waveforms do not have a sub-carrier transmitted in the DC term of the waveform. Accordingly, this sub-carrier is unmodulated and blank. FIG. 18 shows an OFDM waveform 1810 with blanked DC term sub-carrier 1811. The present embodiment proposes utilizing this DC term to embed a low power sub-carrier, with perhaps one bit of data per OFDM symbol, wherein watermark information is encoded on this sub-carrier. To illustrate, OFDM waveform 1820 is shown having a DC term sub-carrier 1821 that is not blank. The DC term sub-carrier 1831 in waveform 1830, however, is a low power DC term sub-carrier. Having a lower power allows this sub-carrier 1831 to be less conspicuous and will likely be ignored as noise. It should be noted that this embedded DC term sub-carrier can be, but does not necessarily have to be, modulated. The detected existence of such a DC term sub-carrier may be an authenticating means as well.

Channel Switching Time

Channel switching time is the time between the receipt of a data packet in a receiver and the sending of an acknowledgment (ACK) from the receiver. The present embodiment proposes manipulating this channel switching time as a means of transmitting watermark information. In an IEEE 802.11 OFDM system, WTRUs are either transmitting or receiving, but not both. When transmitting, a window is left open by a receiver before others can receive the transmitted signal. The receiver's ACK response time can be varied in a predetermined matter so as to provide an authenticating signature. For example, a receiver may delay transmitting an ACK for every other packet received. Alternatively, a receiver may transmit an ACK at some consistent time interval.

Transmit Modulation Accuracy for its constellation

Figure 19:
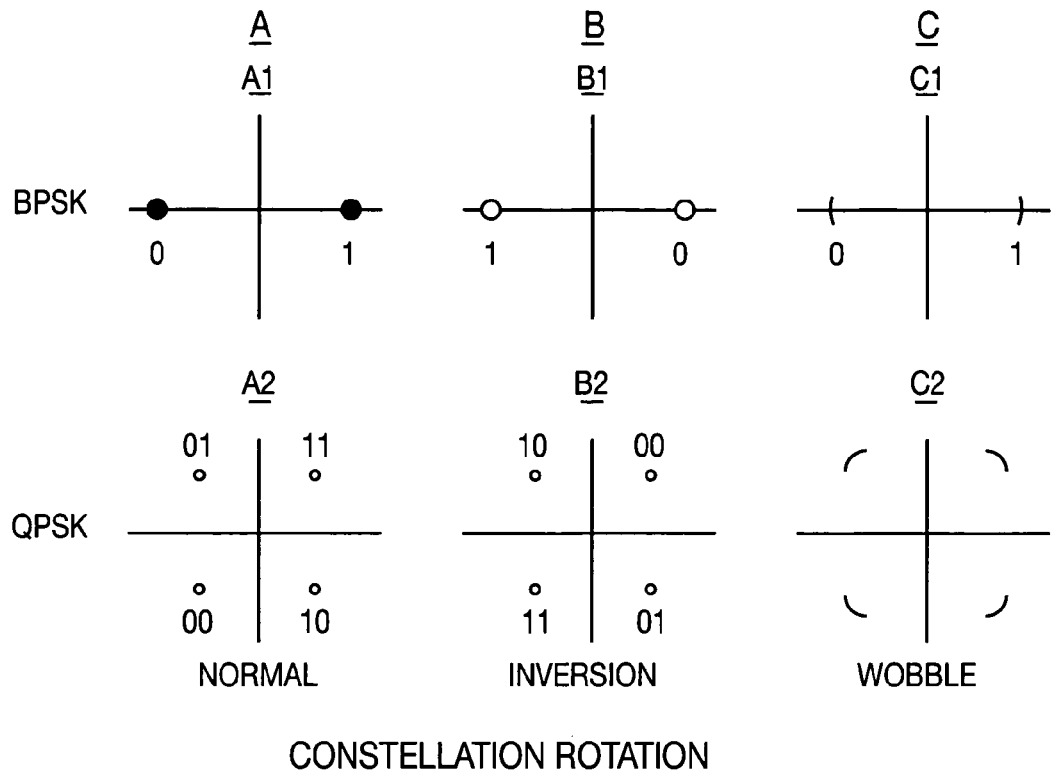
FIG. 19 illustrates watermarking by manipulating constellation patterns in accordance with one embodiment of the present invention.

The present embodiment proposes to manipulate OFDM symbol constellation patterns so as to produce an authenticating signature, while continuing to meet transmit modulation mask standards. This concept is illustrated in FIG. 19. Shown in column A of this Figure are the normal constellation patterns A1 and A2 for an OFDM symbol modulated using a BPSK and QPSK scheme, respectively. One method of manipulating symbol constellation patterns is shown in column C, wherein the transmit accuracy has been slightly altered so as to produce wobble-shaped constellation patters C1 and C2. This pattern can serve as an authentication signature.

As an alternative, OFDM symbol constellations could be phase-rotated by predetermined amounts, which are changed on a slow basis and in a pseudo-random manner. An example of such a manipulation is shown in column B of FIG. 19, wherein the symbol constellations B1 and B2 are rotated 180 degrees, i.e., inverted. In such an embodiment, an eavesdropper cannot detect the signals without cracking the phase-randomization code.

It should be noted that although described with reference to BPSK and QPSK, the present embodiment is applicable to other modulation schemes including QAM, 64-QAM, and the like and higher rate modulation schemes such as, for example, complementary code keying (CCK), defined in IEEE 802.11b.

Antenna Polarization

Figure 20:
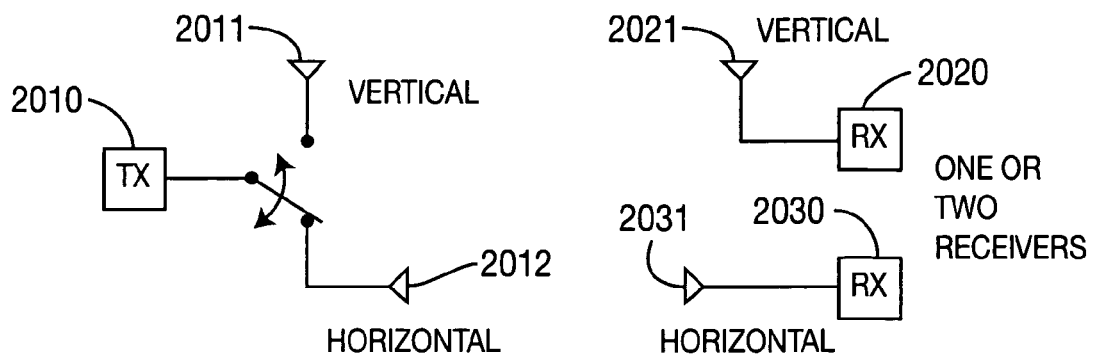
FIG. 20 illustrates antenna polarization in accordance with one embodiment of the present invention.

The present embodiment varies antenna polarization in a synchronized pseudo-random manner in order to create a watermark or an authenticating signature. This concept is illustrated in FIG. 20. Transmitter 2010 is shown having two antennas (or two modes of operation) 2011 and 2012, wherein 2011 is vertically polarized and 2012 is horizontally polarized. Also shown in the Figure are two receivers, 2020 and 2030. Receiver 2020 is shown having a vertically polarized receiving antenna 2021 and receiver 2030 is shown having a horizontally polarized antenna 2031. This might be a single receiver with two antennas or one antenna that supports both modes simultaneously (or sequentially). Transmitter 2010 alternates the transmission of OFDM packets in a pseudo-random manner between its vertical and horizontal antennas 2011, 2012. Receiver 2020 and/or receiver 2030 recognizes that certain packets are received better than others, which indicates to that transmitter 2010 alternated its transmission polarization. This varied polarization pattern can be used to authenticate transmitter 2010 as a trusted data source.

Alternatively, if either of receivers 2020 and 2030 had multiple antennas, one of which was vertically polarized and one of which was horizontally polarized, they would recognize that alternating data packets are received better on one of their antennas versus the other. As described above, this alternating polarization pattern authenticates transmitter 2010 as a desired data source. By differentially encoding the transmit polarization choice, some watermark data could be communicated using this method.

Network Availability

Network availability is the ability to prevent a communications service from becoming unavailable for use by legitimate users. One means for attempting to make a service unavailable is known as a denial of service (DoS) attack. This attack attempts to use up all of a communications service's resources. As one device tries to establish communications with another device, resources are expended in the receiving device as the received data unit is processed. An increasingly greater degree of resources are expended as a data unit makes its way up the protocol stack. The present embodiment proposes to perform authentication of a sender as early as possible at the physical layer using efficient hardware based algorithms. This way, a minimum of resources are expended on denying service to those devices that are unauthorized and possibly malevolent.

A receiver will search for an authentication signature early in the processing of a received data packet. If an expected signature does not exist early in the data packet, the transmitter immediately ceases the processing of that data packet. Accordingly, the receiver is able to preserve its battery and processing resources for authenticated data packets. The sooner a data packet is able to be authenticated, the less susceptible receivers will be to DoS attacks. This concept is illustrated in FIG. 21.

Figure 21:
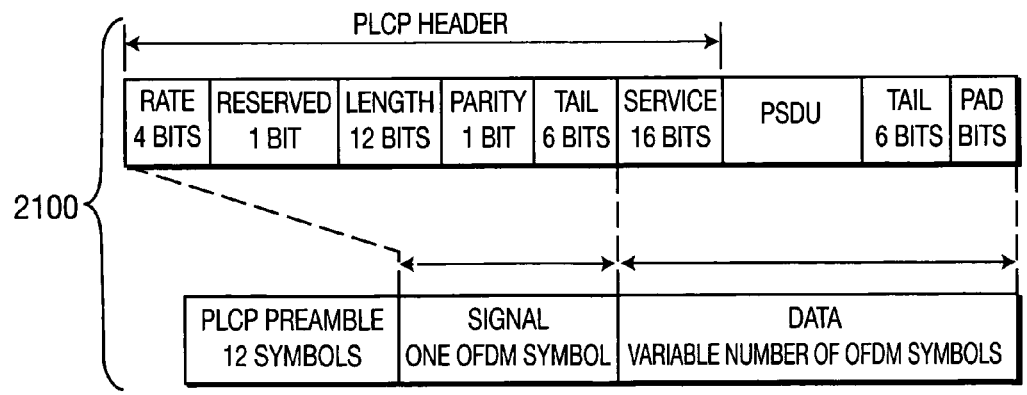
FIG. 21 is an OFDM PPDU in accordance with one embodiment of the present invention.

Shown in FIG. 21 is an OFDM PPDU 2100 formatted so as to provide authenticity once received. A PPDU without a reserved bit set in the PLCP header, for example, can quickly be identified as non-genuine. Alternatively, any of methods for creating waveform signatures discussed above can be utilized to identify a received data packet as genuine early in the demodulation process.

Authentication Key Change

If an unauthenticated transmission is detected via any of the authentication methods discussed above, or through any other means, the present embodiment proposes a method of preventing the unauthorized user from continuing to associate with a servicing base station. Upon detection of an unauthenticated user, a base station or a WTRU communicates the need to disassociate and the need for a new secret key. All authenticated users would have prior knowledge of the next secret key or know how to generate it. Key generation will depend on the type of breach of the system. If the intruder has not gained access to the session key, then the existing channel can be used to exchange information needed to generate the new key. A new key can be generated utilizing a predefined algorithm such as, for example, a function of the old key, a function of the time of day or a function of information relayed in the message sent to disassociate. This key regeneration may be done to increase the cryptographic strength of the session key. If the intruder has gained access to the session key then an alternate channel made secure using shared secret information is used to generate new keys.

Once all users dissociate from the servicing base station, authenticated users would re-authenticate with the new key and re-associate with the servicing base station. Since unauthenticated users are unaware of the new authentication key, they would no longer be able to associate with the servicing base station.

Alternatively, a WEP key can be manipulated such that unauthorized users may still be able to associate, but they will be unable to communicate data.

Intentional PLCP Header CRC or Parity Bit Failure

An alternate embodiment proposes to intentionally corrupt, at some predetermined interval, the cyclic redundancy check (CRC) or a parity check of an OFDM PPDU. FIG. 22A shows the location of a parity check bit 2211 in an OFDM PPDU 2210. An expanded view of Signal field 2212 is shown in FIG. 22B, wherein parity check bit 2211 is indicated. Similarly, CRCs 2221, 2231, and 2241 are shown located on long PLCP PPDU 2220 (FIG. 22C), on a short PLCP PPDU 2230 (FIG. 22D), and on a long preamble PLCP PPDU formatted for CCK-OFDM 2240 (FIG. 22E). These CRCs and parity checks are used to protect packetized data transmissions from bit errors due to noise, interference, collisions, and multi-path in a given RF channel. By corrupting these checks periodically or a predetermined time, a receiver will receive transmission errors at some corresponding rate. If the error rate is as expected, a receiver can authenticate the source of the transmission. The absence of errors or receiving errors at some unexpected rate alerts a receiver that perhaps the transmitter is not a desired data source.

STBC transmit Diversity

Figure 23:
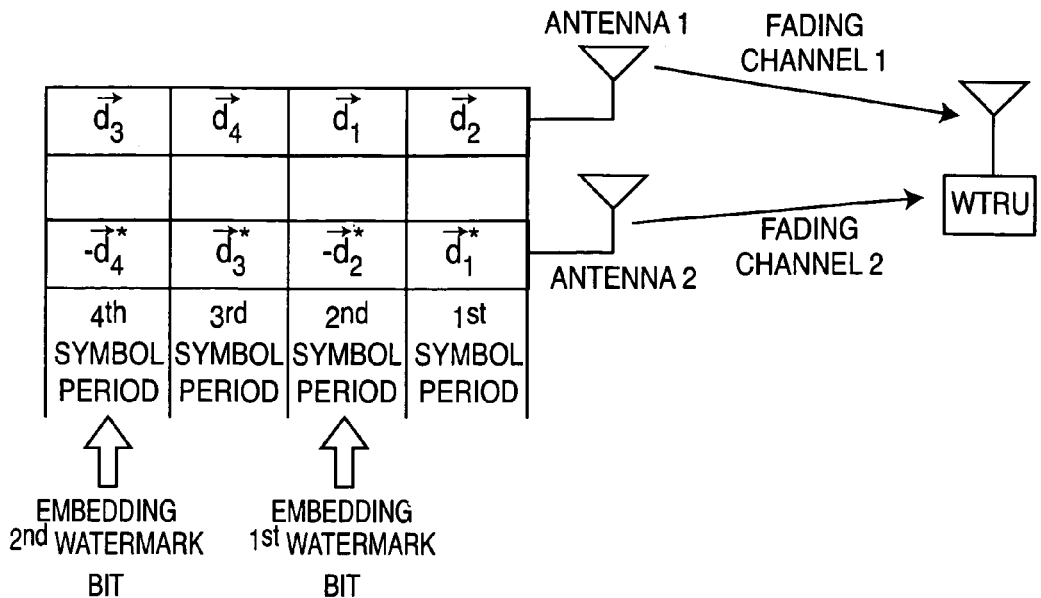
FIG. 23 shows a space-time block coding (STBC) encoder structure in accordance with one embodiment of the present invention.

An alternate embodiment is best described with reference to FIGS. 1C, 23 and 24. Referring first to FIG. 1C it is assumed that the TX TRU transmitter 20 shown in FIG. 1 has four complex-valued data symbols, $\{\vec{d}_1, \vec{d}_2, \vec{d}_3, \vec{d}_4\}$ from symbol rate processing. FIG. 23 illustrates an STBC encoder structure. This transmit diversity techniques constructs a space-time codeword by simultaneously transmitting two different data symbols $\vec{d}*_2$ and $\vec{d}_1$ from antenna 1 and diversity antenna 2, respectively, as shown in FIG. 23, during a first symbol period, where "*" denotes the conjugate operator of a complex scalar or vector. Then symbols $\vec{d}_1$ and $-\vec{d}*_2$ are sent from antennas 1 and 2, respectively, in the second symbol period. Similarly, in the third symbol period, $\vec{d}_4$ and $\vec{d}*_3$ are transmitted from antennas 1 and 2, respectively, while symbols $\vec{d}_3$ and $-\vec{d}*_4$ are sent from antennas 1 and 2, respectively, in the fourth symbol period. In the present embodiment, two watermark bits may be embedded into the symbols, every other symbol period, as follows: if the first watermark bit is equal to "zero", symbols in the second symbol period are flipped such as from ($\vec{d}_1$ and $-\vec{d}*_2$) to ($-\vec{d}_1$ and $\vec{d}*_2$). Otherwise, if the first watermark bit is "one", the symbols are kept as they are. Similarly, if the second watermark bit is equal to "zero", then symbols in the fourth symbol period are flipped such as from ($\vec{d}_3$ and $-\vec{d}*_4$) to ($-\vec{d}_3$ and $\vec{d}*_4$). Otherwise, the two symbols in the fourth symbol period remain same as they are.

SFBC Transmit Diversity

Figure 24:
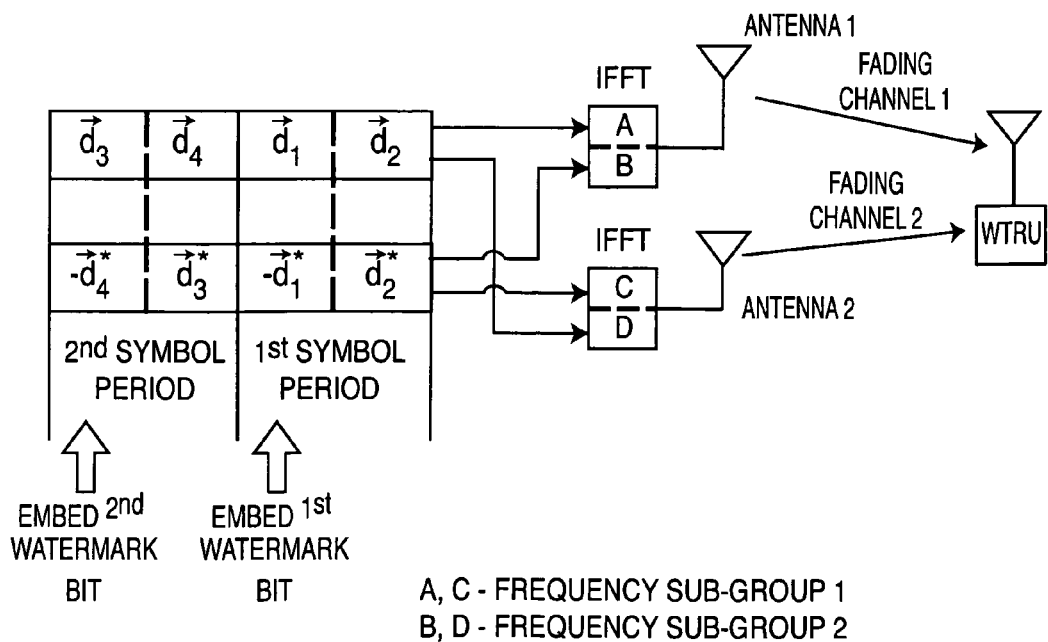
FIG. 24 shows a space-frequency block coding (SFBC) encoder structure in accordance with one embodiment of the present invention.

A similar watermarking process can be implemented in an SFBC encoder structure, as shown in FIG. 24. This transmit diversity techniques constructs a space-frequency codeword by simultaneously transmitting two different data symbols $\vec{d}_2$ and $\vec{d}*_1$ from frequency sub-group 1 and diversity frequency sub-group 2, respectively, as shown in FIG. 24, during a first symbol period, where "*" denotes the conjugate operator of a complex scalar or vector. Then symbols $\vec{d}_1$ and $-\vec{d}*_2$ are sent from frequency sub-groups 1 and 2, respectively, in the second symbol period. Similarly, in the third symbol period, $\vec{d}_4$ and $\vec{d}*_3$ are transmitted from frequency sub-groups 1 and 2, respectively, while symbols $\vec{d}_3$ and $-\vec{d}*_4$ are sent from frequency sub-group 1 and diversity frequency sub-group 2, respectively, in the fourth symbol period. In the present embodiment, two watermark bits may be embedded into the symbols, every other symbol period, as follows: if the first watermark bit is equal to "zero", symbols in the second symbol period are flipped such as from ($\vec{d}_1$ and $-\vec{d}*_2$) to ($-\vec{d}_1$ and $\vec{d}*_2$). Otherwise, if the first watermark bit is "one", the symbols are kept as they are. Similarly, if the second watermark bit is equal to "zero", then symbols in the fourth symbol period are flipped such as from ($\vec{d}_3$ and $-\vec{d}*_4$) to ($-\vec{d}_3$ and $\vec{d}*_4$). Otherwise, the two symbols in the fourth symbol period remain same as they are.

Hadamard P-Spreading

The channel matrix in an OFDM-Multiple In, Multiple Out (MIMO) system may be represented by the following, $$H = \begin{bmatrix} H_{1,1} & \cdots & H_{1,nt} \\ \vdots & \ddots & \vdots \\ H_{nr,1} & \cdots & H_{nr,nt} \end{bmatrix}$$

where submatrices $H_{ij}$ are diagonal matrices which contain the frequency response of the channel impulse response from transmit antenna j to receive antenna i. Since the channel correlation matrix is characterized by $H^H H$, spreading may be accomplished by pre and post multiplying by a unitary spreading matrix S: $S^H H^H H S$. Since one dimension is space (antenna) and the other is frequency space-frequency, spreading may be accomplished by this operation. If S is chosen to be a Hadamard matrix $S^H S = 1$ as required. Spreading is accomplished by using permutations of S for each symbol transmission. By using a unique permutation sequence identified by a sequence W, a watermark may be communicated via the spreading matrix.

Eigen-Space

By Eigen-decomposition of a channel correlation matrix, optimum transmit and receive beam-forming may be applied provided that information about the channel correlation matrix is available at the transmitter and receiver. The optimum transmit and receive beam-forms are characterized by their Eigen-modes via Eigen-decomposition of the channel matrix H as shown in Equation 4:

$$H = U D V^H \quad \text{Equation (4)}$$

If a precoder operation T and postcoder operation R is done, the Equation is:

$$THR = TUDV^H R \quad \text{Equation (5)}$$

Therefore the pre-coder and post-coder operations respectively are:

$$T = DU^H, R = VD \quad \text{Equation (6)}$$

By this decomposition, the channel is decomposed into N equivalent channels characterized by the N Eigen-modes of the channel, where N is the number of antennas given by min{Nt,Nr}. Since the channel is able to support N equivalent channels, it is possible to spread watermark information bits across the channels in a deterministic manner for example by using a permutation sequence as is done with Hadamard spreading.

Utilizing a PAR reduction Technique for Watermarking:

It is well known that the main limitation of OFDM systems is the high peak-to-average power ratio (PAR) of OFDM signals, due to the superposition of a high number of modulated sub-carrier channel signals. Furthermore, large peaks will occasionally reach the amplifier saturation region and result in signal distortion causing Bit-Error Rate (BER) degradation. A typical solution for the PAR reduction is to generate a set of OFDM signals by multiplying the modulating user data in the frequency domain with a set of different phase vectors (or a set of pseudo-random vectors) known to both the transmitter and receiver, before applying the Inverse Discrete Fourier Transform (IDFT). The transmitter will then choose the resulting OFDM symbol exhibiting the lowest peak factor and transmits this together with the chosen phase (or pseudo-random) vector's identification. The present embodiment proposes embedding watermark information into the set of different phase (or pseudo-random) vectors designed for the PAR reduction, by multiplying each vector in the vector set by the watermark message. In other words, the individual vector in the set is modified by multiplying it by the watermark message. The resulting set is then used for the PAR reduction solution. As a consequence, the watermark information is carried on the PAR controlled OFDM signal.

Other possible schemes of steganographically embedding digital information in communication signals are disclosed in copending patent application Ser. No. 11/034,987 entitled "Code Division Multiple Access (CDMA) Method and Apparatus for Protecting and Authenticating Wirelessly Transmitted Digital Information" filed Jan. 13, 2005, and copending patent application Ser. No. 11/032,780 entitled "Watermarks/Signatures for Wireless Communications" filed Jan. 11, 2005, which are incorporated by reference as if fully set forth.

Although the features and elements of the present invention are described in the preferred embodiments in particular combinations, each feature or element can be used alone without the other features and elements of the preferred embodiments or in various combinations with or without other features and elements of the present invention. Although the various embodiments discussed above are described with reference to certain layers, it should be understood that any of the embodiments can be implemented in any layer or any combination of layers. Further, the features and elements of the present invention may be implemented on a single IC, such as an application specific integrated circuit (ASIC), multiple ICs, discrete components, or a combination of discrete components and ICs. Moreover, the present invention may be implemented in any type of wireless communication system.

While the present invention has been described in terms of the preferred embodiment, other variations which are within the scope of the invention as outlined in the claims below will be apparent to those skilled in the art.

What is claimed is:

1. A method for wireless orthogonal frequency division multiplexing (OFDM) communications, the method comprising:
receiving an electromagnetic OFDM communication signal, wherein the OFDM communication signal is an electromagnetic signal or an electronic signal including embedded digital information, wherein the digital information is encoded by performing a first code puncturing of one or more sub-carriers of the OFDM communication signal at a first forward error correction (FEC) rate and performing a second code puncturing of the one or more sub-carriers of the OFDM communication signal at a second FEC rate, wherein the second FEC rate is higher than the first FEC rate, and wherein the digital information includes watermark information that is steganographically embedded in a portion of the digital information that is discarded when performing the second code puncturing such that the digital information appears to be encoded at the first FEC rate;
extracting the steganographically embedded digital information from the received electromagnetic OFDM communication signal; and
comparing the digital information extracted with a stored information.

2. The method of claim 1 wherein the digital information is encoded on a guard period between each OFDM communication symbol.

3. The method of claim 2 wherein more than one guard period is utilized to encode the digital information.

4. The method of claim 1 wherein the digital information is encoded on pilot sub-carriers.

5. The method of claim 4 wherein the digital information is encoded as manipulating a specified pilot sub-carrier with information which is opposite of what is expected in a receiver.

6. The method of claim 4 wherein the digital information is encoded as alternating pilot sub-carriers in a predetermined pattern.

7. The method of claim 1 wherein the digital information is encoded as puncturing of a specific sub-carrier.

8. The method of claim 1 wherein the digital information is encoded as the distance between punctured sub-carriers.

9. The method of claim 1 wherein the digital information is encoded as varying amplitude level of particular sub-carriers in a predetermined manner.

10. The method of claim 9 wherein amplitude level of consecutive symbols are varied for transferring the digital information.

11. The method of claim 9 wherein amplitude level of even numbered sub-carriers and amplitude level of odd numbered sub-carriers are varied for transferring the digital information.

12. The method of claim 1 wherein the digital information is encoded using a sub-carrier located periphery of OFDM transmission spectrum.

13. The method of claim 12 wherein additional peripheral sub-carrier is added for carrying the digital information.

14. The method of claim 1 wherein the digital information is encoded as modifying a polynomial for a particular scrambling code.

15. The method of claim 1 wherein the digital information is encoded as modifying a polynomial for a cyclic redundancy check (CRC).

16. The method of claim 1 wherein the digital information is encoded utilizing synchronization bits.

17. The method of claim 16 wherein the synchronization bits are scrambled for transferring the digital information.

18. The method of claim 16 wherein the number of synchronization bits are varied for transferring the digital information.

19. The method of claim 16 wherein the synchronization bits are altered in every data packet transmission in a predetermined pattern.

20. The method of claim 1 wherein the digital information is encoded utilizing bits in an OFDM header field.

21. The method of claim 20 wherein unused bits in a service field is utilized.

22. The method of claim 20 wherein unused bits in an OFDM communication signal field are utilized.

23. The method of claim 22 wherein bits in a rate field are utilized.

24. The method of claim 23 wherein an unspecified bit pattern replacing a specified bit pattern is utilized to encode the digital information.

25. The method of claim 23 wherein an OFDM data packet is intentionally mapped incorrectly at a predetermined time or time interval.

26. The method of claim 21 wherein bits in a reserved field are toggled in a predetermined pattern.

27. The method of claim 1 wherein the digital information is encoded utilizing tail bits.

28. The method of claim 27 wherein the tail bits are either header tail bits or convolutional tail bits.

29. The method of claim 1 wherein the digital information is encoded utilizing pad bits.

30. The method of claim 1 wherein the digital information is encoded by delaying a particular OFDM symbol in a predetermined pattern.

31. The method of claim 1 wherein the digital information is encoded by offsetting the OFDM carrier frequency in a predetermined manner.

32. The method of claim 31 wherein more than one step of frequency offset is utilized, whereby more than one digital information is encoded by one frequency offset.

33. The method of claim 1 wherein the digital information is encoded by code puncturing after FEC coding is completed.

34. The method of claim 1 wherein the digital information is encoded by utilizing more than one pulse shaping in a predetermined manner.

35. The method of claim 1 wherein the digital information is encoded utilizing DC term sub-carrier.

36. The method of claim 1 wherein the digital information is encoded by varying channel switching time, whereby a receiver's acknowledgement (ACK) response time is varied in a predetermined pattern.

37. The method of claim 1 wherein the digital information is encoded by changing OFDM symbol constellation pattern.

38. The method of claim 37 wherein a transmit accuracy is altered to produce wobble-shaped constellation pattern.

39. The method of claim 37 wherein the constellation pattern is rotated in a particular degree.

40. The method of claim 1 wherein the digital information is encoded by alternating antenna polarization in a predetermined pattern.

41. The method of claim 1, further comprising:
denying a service to a user on a condition that said user is known to be unauthenticated.

42. The method of claim 41 wherein the authenticity of the user is checked at the earliest stage of communication.

43. The method of claim 41, further comprising:
disassociating all associated users and wherein authorized users obtain a new session key upon detecting the unauthenticated user.

44. The method of claim 43 wherein each authorized user generates the new session key by at least one of a function of an old session key, a function of the time of day and a function of information transmitted to users informing them to disassociate.

45. The method of claim 1 wherein the digital information is encoded by intentionally corrupting forward error correction coding in a predetermined pattern, whereby a transmission is authenticated on a condition that the receiver detects a particular error rate.

46. The method of claim 1 wherein more than one embedded channel is utilized to carry the digital information.

47. The method of claim 46 wherein the embedded channel is changed in a predetermined manner.

48. The method of claim 46 wherein the embedded channel is encrypted.

49. The method of claim 1 wherein the digital information is embedded steganographically in the OFDM communication signal by:
a transmitter as a watermark in a transmitting (TX) layer 2/3.

50. The method of claim 1 wherein the digital information is embedded steganographically in the OFDM communication signal by:
a transmitter as a watermark in a transmitting (TX) physical layer.

51. The method of claim 1 wherein the digital information is embedded steganographically in the OFDM communication signal by:
a transmitter as a watermark in a transmitting (TX) radio frequency (RF) layer.

52. The method of claim 1 wherein extracting the steganographically embedded digital information from the received OFDM communication signal further comprises:
a receiver extracting the digital information from the OFDM communication signal using a receiving (RX) layer 2/3 processing device.

53. The method of claim 1 wherein extracting the steganographically embedded digital information from the received OFDM communication signal further comprises:
a receiver extracting the digital information from the OFDM communication signal using a receiving (RX) physical layer processing device.

54. The method of claim 1 wherein extracting the steganographically embedded digital information from the received OFDM communication signal further comprises:
a receiver extracting the digital information from the OFDM communication signal using a receiving (RX) radio frequency (RF) processing device.

55. A method for wireless orthogonal frequency division multiplexing (OFDM) communications, the method comprising:
receiving an OFDM communication signal, wherein the OFDM communication signal is an electromagnetic signal or an electronic signal including embedded physical channels within the OFDM communication signal and embedded digital information wherein the digital information is encoded by performing a first code puncturing of one or more sub-carriers of the OFDM communication signal at a first forward error correction (FEC) rate and performing a second code puncturing of the one or more sub-carriers of the OFDM communication signal at a second FEC rate, wherein the second FEC rate is higher than the first FEC rate, and wherein the digital information includes watermark information that is steganographically embedded in a portion of the digital information that is discarded when performing the second code puncturing such that the digital information appears to be encoded at the first FEC rate;
extracting the steganographically embedded digital information from the received OFDM communication signal; and
comparing the digital information extracted with a stored information.

56. The method of claim 55 wherein the OFDM communication signal is maintained on a condition that there is no data to transmit.

57. The method of claim 56 wherein the embedded physical channels continue to transmit steganographically embedded digital information on a condition that the OFDM communication signal has no data to transmit.

58. The method of claim 56 wherein the OFDM communication signal is a cover signal for the embedded physical channels.

59. A wireless transmit/receive unit (WTRU) comprising:
a processor configured to create an electromagnetic orthogonal frequency division multiplexing (OFDM) communication signal, wherein the OFDM communication signal is an electromagnetic signal or an electronic signal including embedded digital information, wherein the digital information is encoded by performing a first code puncturing of one or more sub-carriers of the OFDM communication signal at a first forward error correction (FEC) rate and performing a second code puncturing of the one or more sub-carriers of the OFDM communication signal at a second FEC rate, wherein the second FEC rate is higher than the first FEC rate, and wherein the digital information includes watermark information that is steganographically embedded in a portion of the digital information that is discarded when performing the second code puncturing such that the digital information appears to be encoded at the first FEC rate;
a receiver configured to extract the steganographically embedded digital information from the received electromagnetic OFDM communication signal; and
a comparator configured to compare the digital information extracted with stored information at the receiver.

* * * * *